US009966103B2

(12) United States Patent
Hashizume et al.

(10) Patent No.: US 9,966,103 B2
(45) Date of Patent: May 8, 2018

(54) IMAGING APPARATUS AND IMAGE RECORDING PROCESSING METHOD

(71) Applicant: SONY CORPORATION, Tokyo (JP)

(72) Inventors: Ryota Hashizume, Kanagawa (JP); Hiroshi Sudo, Tokyo (JP)

(73) Assignee: SONY CORPORATION, Tokyo (JP)

( * ) Notice: Subject to any disclaimer, the term of this patent is extended or adjusted under 35 U.S.C. 154(b) by 842 days.

(21) Appl. No.: 14/252,424

(22) Filed: Apr. 14, 2014

(65) Prior Publication Data
US 2014/0321828 A1 Oct. 30, 2014

(30) Foreign Application Priority Data

Apr. 30, 2013 (JP) ................................ 2013-094980

(51) Int. Cl.
*H04N 5/77* (2006.01)
*G11B 20/10* (2006.01)
*H04N 5/445* (2011.01)

(52) U.S. Cl.
CPC ....... *G11B 20/10527* (2013.01); *H04N 5/772* (2013.01); *G11B 2020/10712* (2013.01); *H04N 5/445* (2013.01)

(58) Field of Classification Search
None
See application file for complete search history.

(56) References Cited

U.S. PATENT DOCUMENTS

2004/0136685 A1* 7/2004 Ota .................. H04N 5/232
386/225

FOREIGN PATENT DOCUMENTS

JP 2000-069428 A 3/2000

* cited by examiner

*Primary Examiner* — Heather Jones
(74) *Attorney, Agent, or Firm* — Chip Law Group

(57) ABSTRACT

Recording in a memory configured to temporarily record captured images is controlled in response to a shift instruction from a user. A control unit receives, from the user, the shift instruction containing an information item of specifying any of images displayed on a display unit, and updates an image recording start position in the memory in response to the shift instruction. A recording region for preceding captured images with respect to the updated recording start position is set as an overwritable region so that subsequent captured images can be recorded. The display unit displays, for example, images captured at intervals of a predetermined time period so that the user can select any of the images and issue the shift instruction. In this way, a region preceding a position of a selected image in the memory is set to be overwritable so that the subsequent captured images are recorded.

15 Claims, 21 Drawing Sheets

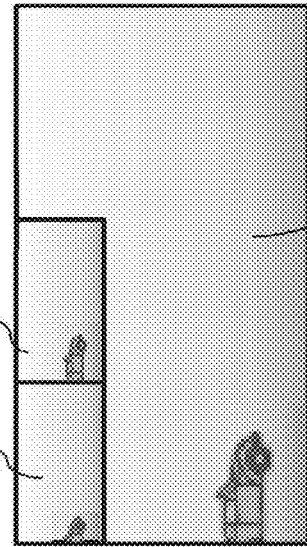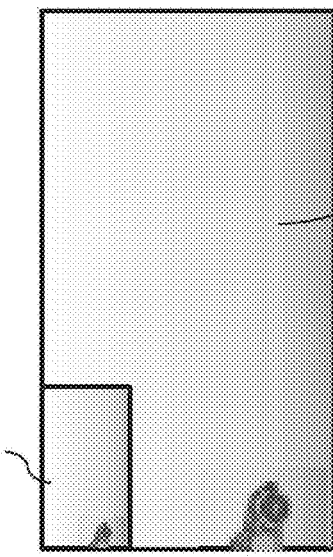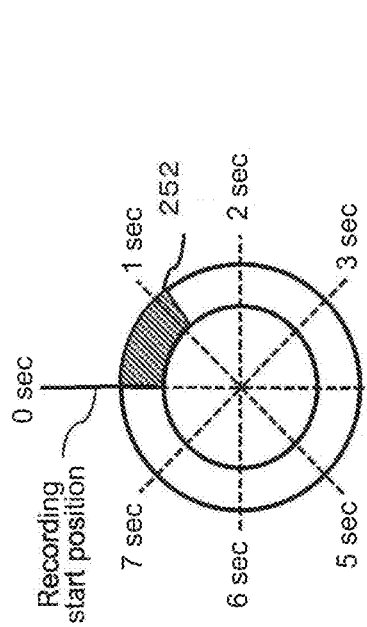
FIG.5A
FIG.5B

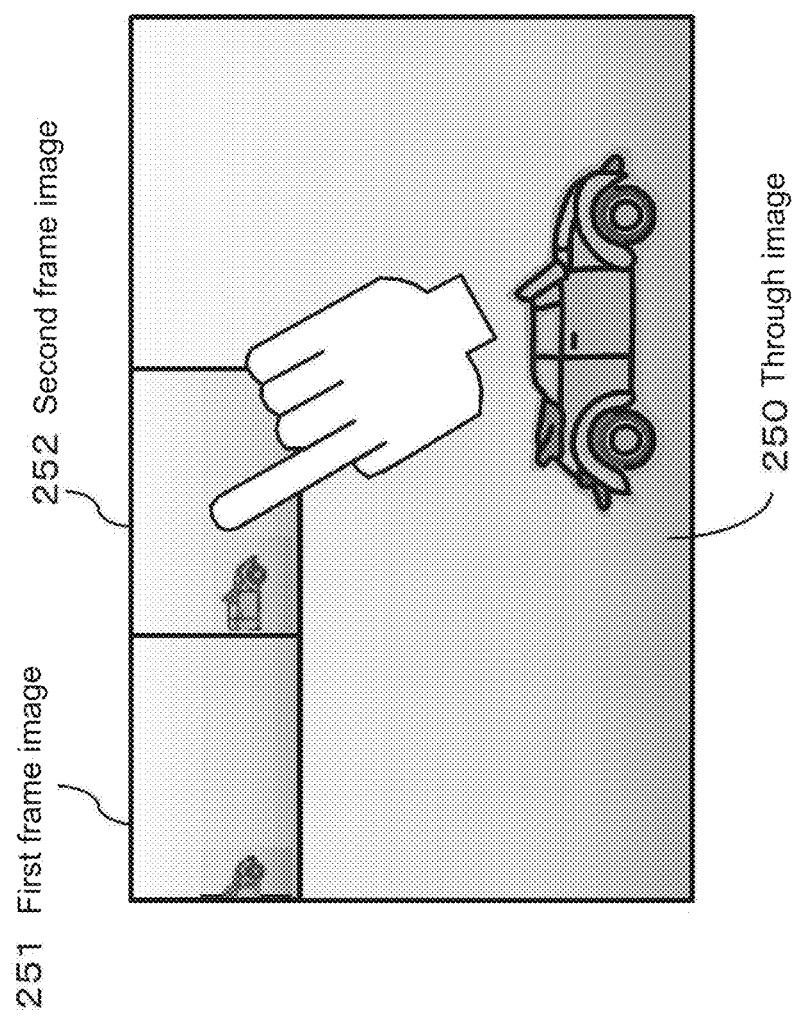

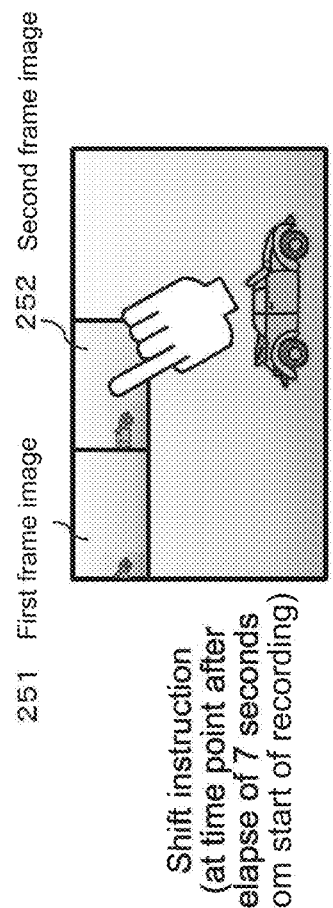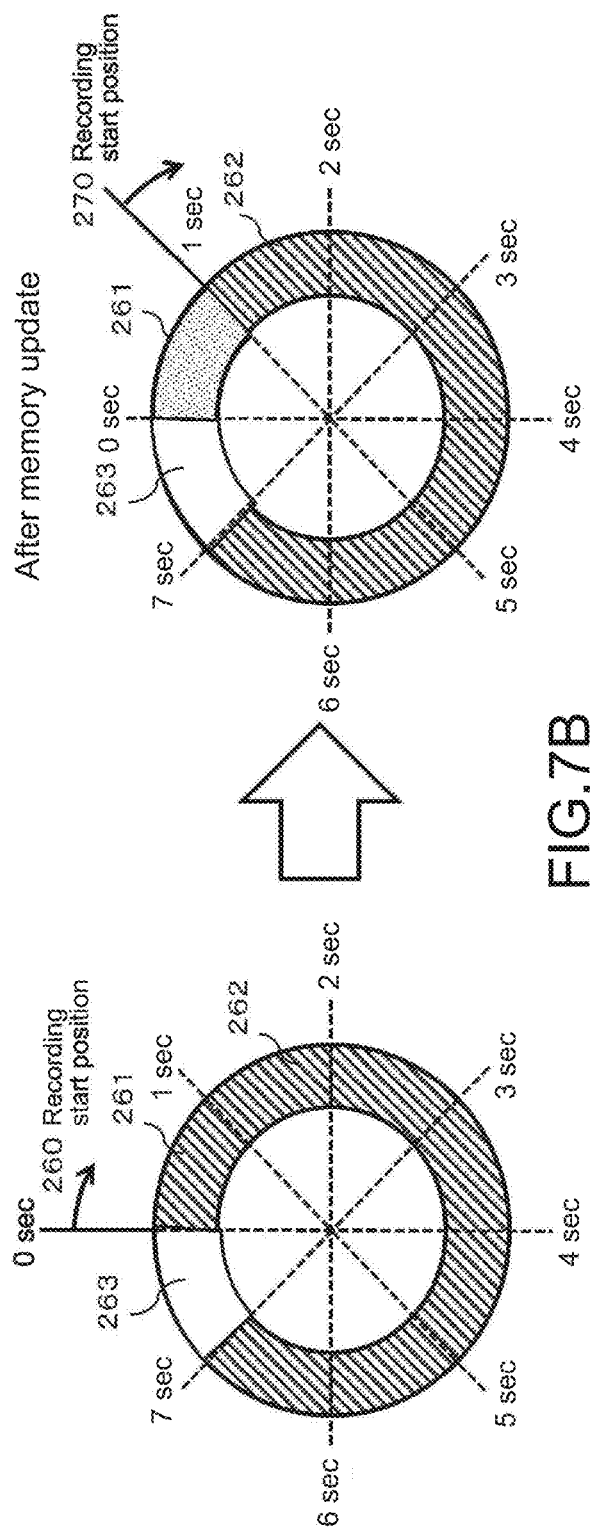

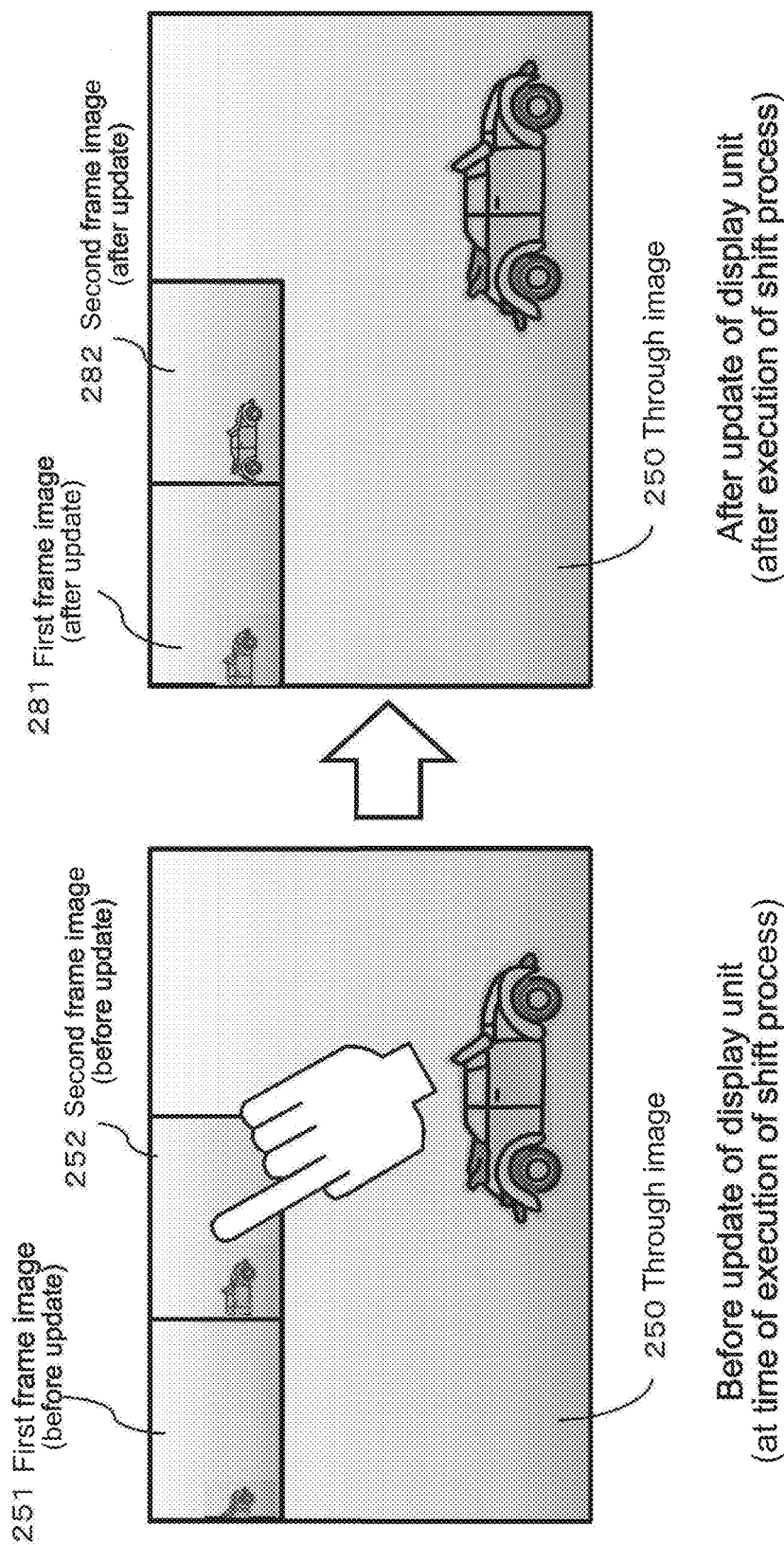

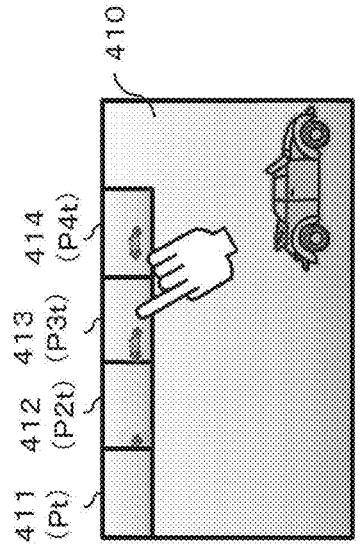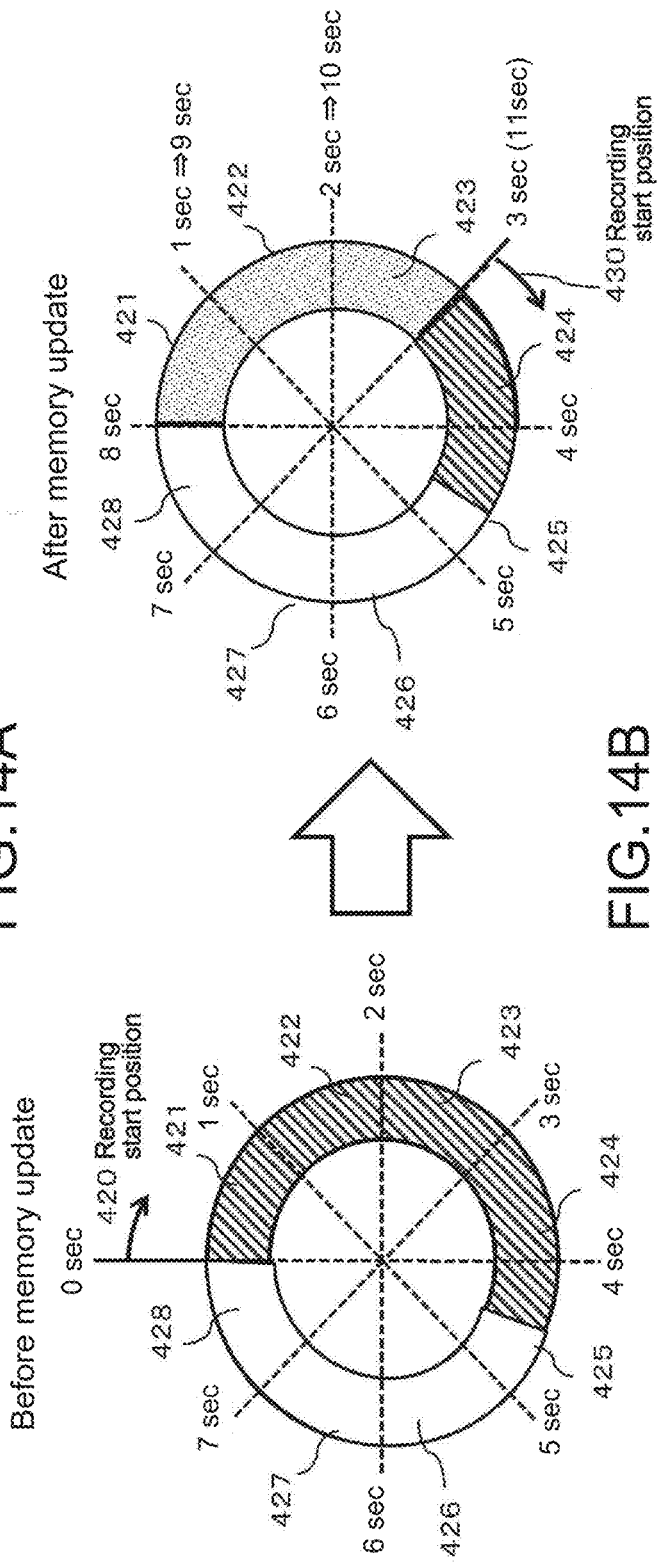

IMAGING APPARATUS AND IMAGE RECORDING PROCESSING METHOD

CROSS REFERENCE TO RELATED APPLICATIONS

This application claims the benefit of Japanese Priority Patent Application JP 2013-094980 filed Apr. 30, 2013, the entire contents of which are incorporated herein by reference.

BACKGROUND

The present disclosure relates to an imaging apparatus, an image recording processing method, and a program. More specifically, the present disclosure relates to an imaging apparatus, an image recording processing method, and a program that enable a captured moving image, which is temporarily stored in a memory and then recorded in a medium, to be shifted to a segment as a user likes.

As a moving-image capturing function of a camcorder, there is a function to set a predetermined time period of, for example, 5 seconds from a time point when a user presses a capture start button (for example, REC button) as a moving-image capture time period, and to automatically end the moving image capture after elapse of the 5 seconds. This function is referred to, for example, as "snap moving image capture."

For example, this function enables a user (photographer) to easily capture a moving image containing an active photographic subject only by directing a camera to the active photographic subject and pressing the capture start button at a moment when entry of the photographic subject to a monitor of a camera can be grasped.

However, the "snap moving image capture" function in related art has a problem that the moving-image capture time period is fixed and cannot be prolonged. Specifically, the fixed moving-image capture time period is set, for example, to 5 seconds from a time point when a user presses the capture start button (for example, REC button). Thus, there is another problem that scenes to be captured after elapse of the fixed time period cannot be captured.

Japanese Patent Application Laid-open No. 2000-69428 discloses a configuration of solving such problems, that is, enabling a user (photographer) to prolong the moving-image capture time period.

In the configuration disclosed in Japanese Patent Application Laid-open No. 2000-69428, whether or not a user has pressed a capture button (REC) at a capture end timing predetermined as that in the "snap moving image capture." In a case where the user has pressed the capture button, the capture is continued until the pressing is cancelled.

This configuration enables the user (photographer) to prolong a capture time period to be longer than a predetermined time period.

However, in order to prolong the capture time period in this way, capacity of a memory configured to store data of captured images has to be sufficiently secured in advance. When the capacity of the memory configured to record the captured images is limited, prolongation of the capture time period is limited in accordance with the capacity of the memory.

Generally, for example, 30 frames to 60 frames of images are captured per second during moving-image capture, in other words, a frame rate is set to range from 30 fps to 60 fps (frames per second). Many of cameras that have been used in recent years have a high-speed capture function to capture images of, for example, 120 frames to 240 frames, or 240 frames or more per second.

In the cameras having such a high-speed capture function, a large number of frame images are input within a short time period from an image pickup element. Meanwhile, in order to record image data in media such as an SD card as a final image recording unit, image encoding processes need to be executed with a codec (encoding processing unit). The encoding processes are difficult to execute as fast as to follow the input of the images. Thus, captured images are difficult to encode in real time and record in a medium.

In view of such circumstances, a process of temporarily storing the images input from the image pick-up element in a buffer memory, encoding the images stored in the buffer after capture completion, and recording the images in the medium is executed in many cases.

In such a configuration of storing the images input from the image pick-up element in the memory as a temporary data storage, an upper limit of the number of frames of captured images is set in accordance with capacity of the memory, with the result that a capture time period is limited. Thus, when the user (photographer) operates a camera inadvertently at an inappropriate timing, capture of an image-to-be-captured is more liable to fail.

SUMMARY

There is a need for providing an imaging apparatus, an image recording processing method, and a program that enable a moving-image segment that is finally recorded in a medium to be easily changed in imaging apparatus in which storage capacity of a memory configured to temporarily store captured images is limited.

According to a first embodiment of the present disclosure, there is provided an imaging apparatus, including:

a memory configured to store data items of images input via an imaging unit;

a display unit configured to display the images stored in the memory; and a control unit configured to control recording of the images stored in the memory in response to a shift instruction from a user, the control unit executing memory control of updating a recording start position of the data items of the images stored in the memory in response to the shift instruction from the user, the shift instruction containing an information item of specifying any of the images displayed on the display unit, and setting an overwritable region in a recording region for preceding captured images with respect to the updated recording start position, to thereby secure a recording region for subsequent captured images.

Further, in the imaging apparatus according to the first embodiment of the present disclosure, the control unit executes a memory update process of setting a recording position of a specified image in the memory as a new recording start position in response to the shift instruction from the user, the shift instruction containing the information item of specifying any of the images displayed on the display unit.

Still further, in the imaging apparatus according to the first embodiment of the present disclosure, the control unit executes display control so that an already captured image stored in the memory is displayed as a first frame image on the display unit, and that an image captured after elapse of a predetermined time period T from a time point when the first frame image is captured is displayed as a second frame image on the display unit, and executes a memory update process of setting a recording position of the second frame image in the memory as a new recording start position in response to the shift instruction from the user, the shift instruction containing an information item of specifying the second frame image.

Yet further, in the imaging apparatus according to the first embodiment of the present disclosure, the control unit executes the memory update process of setting the recording position of the second frame image in the memory as the new recording start position, and a display-unit update process in which the second frame image displayed on the display unit is displayed as an updated first frame image, and an image captured after elapse of the predetermined time period T from a time point when the updated first frame image is captured is displayed as an updated second frame image.

Yet further, in the imaging apparatus according to the first embodiment of the present disclosure, the control unit executes display control of sequentially displaying images captured at intervals of the predetermined time period T on the display unit, and a memory update process of setting a recording position of a specified image in the memory as a new recording start position in response to the shift instruction from the user, the shift instruction containing an information item of specifying any of the images sequentially displayed on the display unit.

Yet further, in the imaging apparatus according to the first embodiment of the present disclosure, the control unit executes the memory update process of setting the recording position of the specified image in the memory as the new recording start position, and a display-unit update process of deleting images displayed on the display unit, the deleted images being captured preceding the specified image, and sequentially displaying the specified image and images that are captured subsequently to the specified image at the intervals of the predetermined time period T.

Yet further, in the imaging apparatus according to the first embodiment of the present disclosure, the control unit executes display control of equally dividing, in a capture time direction, images from a captured image at the recording start position in the memory to a currently captured image, and sequentially displaying images at respective boundaries on the display unit, and a memory update process of setting a recording position of a specified image in the memory as a new recording start position in response to the shift instruction from the user, the shift instruction containing an information item of specifying any of the images sequentially displayed on the display unit.

Yet further, the imaging apparatus according to the first embodiment of the present disclosure further includes a motion amount detection unit configured to detect a motion amount of a photographic subject in captured images, and the control unit executes a process of displaying an image corresponding to a peak of the motion amount on the display unit by using information detected by the motion amount detection unit.

Yet further, in the imaging apparatus according to the first embodiment of the present disclosure, the control unit executes a memory update process of setting a recording position of the image corresponding to the peak of the motion amount as a new recording start position in response to the shift instruction from the user, the image corresponding to the peak of the motion amount being stored in the memory and specified by the user, the shift instruction containing the information item of specifying any of the images displayed on the display unit.

Yet further, in the imaging apparatus according to the first embodiment of the present disclosure, the control unit executes, in response to the shift instruction from the user, a memory update process of specifying a motion-amount-local-minimum image corresponding to a local minimum value of the motion amount preceding a capture timing of the image corresponding to the peak of the motion amount, and setting a recording position of the specified motion-amount-local-minimum image in the memory as a new recording start position, the image corresponding to the peak of the motion amount being specified by the user, the shift instruction containing the information item of specifying any of the images displayed on the display unit.

Yet further, in the imaging apparatus according to the first embodiment of the present disclosure, the control unit updates the recording start position of the data items of the images stored in the memory in response to the shift instruction from the user, and executes a thinning-out process on recorded data items of the preceding captured images with respect to the updated recording start position so that the overwritable region is set in the part of the recording region for the preceding captured images, to thereby secure the recording region for the subsequent captured images.

Yet further, in the imaging apparatus according to the first embodiment of the present disclosure, the control unit executes a data thinning-out process of lowering frame rates of the recorded data items of the preceding captured images with respect to the updated recording start position, and setting an image recording region for images that are changed into deletion objects by the lowering of the frame rates as the overwritable region, to thereby secure the recording region for the subsequent captured images.

Further, according to a second embodiment of the present disclosure, there is provided an image recording processing method that is executed in an imaging apparatus, the imaging apparatus including:

a memory configured to store data items of images input via an imaging unit;

a display unit configured to display the images stored in the memory; and a control unit configured to control recording of the images stored in the memory in response to a shift instruction from a user, in which the control unit executes memory control of updating a recording start position of the data items of the images stored in the memory in response to the shift instruction from the user, the shift instruction containing an information item of specifying any of the images displayed on the display unit, and setting an overwritable region in a recording region for preceding captured images with respect to the updated recording start position, to thereby secure a recording region for subsequent captured images.

Further, according to a third embodiment of the present disclosure, there is provided a program causing an imaging apparatus to execute an image recording process, the imaging apparatus including:

a memory configured to store data items of images input via an imaging unit;

a display unit configured to display the images stored in the memory; and a control unit configured to control recording of the images stored in the memory in response to a shift instruction from a user, the program causing the control unit to execute memory control of updating a recording start position of the data items of the images stored in the memory in response to the shift instruction from the user, the shift instruction containing an information item of specifying any of the images displayed on the display unit, and setting an overwritable region in a recording region for preceding captured images with respect to the updated recording start position, to thereby secure a recording region for subsequent captured images.

Note that, examples of the program according to the third embodiment of the present disclosure include a program that can be provided, for example, from a recording medium to an information processing apparatus, a computer, and a system that are capable of executing various programs and codes. By executing such a program in a program execution unit of the information processing apparatus, the computer, and the system, processes in accordance with the program are executed.

These and other objects, features and advantages of the present disclosure will become more apparent in light of the following detailed description of best mode embodiments thereof, as shown in the accompanying drawings. Note that, the "system" in this specification refers to a logical collective configuration of a plurality of apparatus, and those apparatus having respective configurations are not necessarily provided in the same casing.

According to an embodiment of the present disclosure, even when capacity of a memory configured to temporarily record captured images is limited, an image segment that is finally recorded in a medium can be easily changed.

Specifically, recording in the memory configured to temporarily record the captured images is controlled in response to a shift instruction from a user. A control unit receives, from the user, the shift instruction containing an information item of specifying any of images displayed on a display unit, and updates an image recording start position in the memory in response to the shift instruction. A recording region for preceding captured images with respect to the updated recording start position is set as an overwritable region so that subsequent captured images can be recorded. The display unit displays, for example, images captured at intervals of a predetermined time period so that the user can select any of the images and issue the shift instruction. In this way, a region preceding a position of a selected image in the memory is set to be overwritable so that the subsequent captured images are recorded.

With the configuration described above, even when the captured images are temporarily recorded in the limited capacity of the memory, the image segment that is finally recorded in the medium can be easily changed.

BRIEF DESCRIPTION OF DRAWINGS

FIGS. 5A and 5B are explanatory views of another example of images displayed on the display unit of the imaging apparatus, and another example of image data items that are stored in the memory;

FIG. 6 is an explanatory view of a shift process by a user;

FIGS. 7A and 7B are explanatory views of a memory update process in a case of executing the shift process;

FIG. 8 is an explanatory view of a display data update process in the display unit in the case of executing the shift process;

FIGS. 14A and 14B are explanatory views of a memory update process in a case of executing the shift process;

DETAILED DESCRIPTION OF EMBODIMENTS

Figure 1:
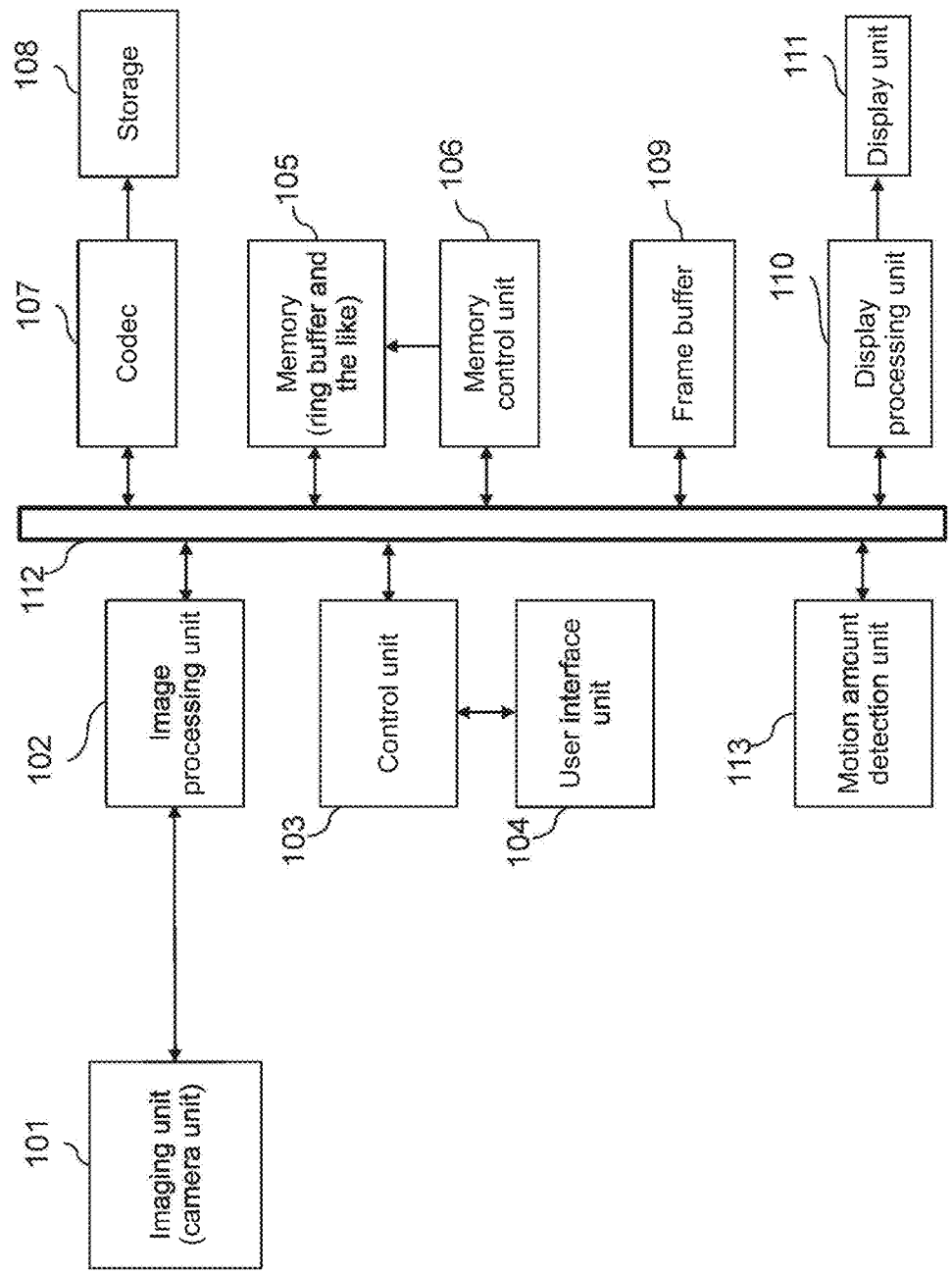
FIG. 1 is an explanatory view of a configuration of an imaging apparatus.

Hereinafter, an imaging apparatus, an image recording processing method, and a program according to embodiments of the present disclosure will be described in detail in the following order with reference to the drawings:

1. Configuration of imaging apparatus
2. Image capture process and image recording process according to first embodiment
3. Example of shift process and image recording process in memory
4. Example of image displayed on display unit
5. Image capture process and image recording process according to second embodiment
6. Modification of second embodiment
7. Image capture process and image recording process according to third embodiment 8. Image capture process and image recording process according to fourth embodiment 9. Summary of advantages of processes that are executed by imaging apparatus according to embodiments of present disclosure 10. Summary of configuration according to embodiments of present disclosure

[1. Configuration of Imaging Apparatus]

First, a configuration example of the imaging apparatus according to embodiments of the present disclosure is described with reference to FIG. 1.

FIG. 1 is a block diagram of a configuration example of the imaging apparatus according to the embodiments of the present disclosure. The configuration of the imaging apparatus, which is shown in FIG. 1, is described.

An imaging unit (camera unit) 101 includes a lens, a CMOS (Complementary Metal Oxide Semiconductor), an AFE (Analog Front End), an ADC (Analog-To-Digital Converter), and other correction processing parts (black correction, defect correction, color mixture correction, shading correction, and noise reduction).

The imaging unit 101 is controlled by a control unit 103, and outputs captured images to an image processing unit 102.

Note that, the imaging unit (camera unit) 101 captures and outputs images at various frame rates ranging from a normal frame rate to a high frame rate based on user setting via a user interface unit 104. For example, various frame rates of from 30 fps to 960 fps (frames/sec) can be set.

The image processing unit 102 receives the images captured by the imaging unit 101, and executes image processes such as a demosaic process of setting information items of colors such as red, green, and blue with respect to pixels, a WB (White Balance) adjustment process, a gamma correction process, and a YUV conversion process.

The control unit 103 includes a CPU (Central Processing Unit), and controls the processes that are executed by the processing units of the imaging apparatus, data exchange among the processing units, and the like.

The CPU executes, for example, programs that predetermine processing sequences so as to cause the processing units to execute processes in accordance with the programs. The control unit 103 includes not only the CPU, but also a timing generator, a program ROM, a RAM as a working region. The CPU executes the programs that are read from the program ROM, and causes the processing units to execute the various processes at timings controlled in response to output signals from the timing generator.

Further, the user interface unit 104 is connected to the control unit 103 so as to receive instructions and operation information from a user. Examples of the user interface unit 104 include a touch panel on a display unit 111, and other operation input units.

A memory 105 is controlled by a memory control unit 106 so as to receive the images that are output from the image processing unit 102 via a bus 112, and temporarily records the images. In other words, the memory 105 is a memory used as a temporary recording region for the captured images. A ring buffer and the like serve as the memory 105.

The memory 105 sequentially records frame images captured by the imaging unit 101. The control unit 103 and the memory control unit 106 effect data reading-writing control on the memory 105, such as control of image recording positions (addresses) in the memory 105 and detection of a recordable region.

A codec 107 acquires the images stored in the memory 105, and executes a compression coding process on data items of the images in accordance with predetermined encoding algorithms such as MPEG encoding. In this way, image data to be recorded in a storage 108 as a final image-recording medium is created by the codec 107 and output to the storage 108.

Examples of the storage 108 include a storage section such as an SD card, which serves as the final recording medium for the captured images.

A frame buffer 109 reads in frame units the images stored in the memory 105, and temporarily stores the read images. The images temporarily stored in the frame buffer 109 are used for the encoding process by the codec 107, and motion detection by a motion amount detection unit 113.

A display processing unit 110 creates images to be displayed on the display unit 111. Specifically, the display processing unit 110 executes a process of converting sizes of the images so that the images can be displayed on the display unit 111, or a process of adding user support information and the like. Alternatively, the display processing unit 110 creates, for example, interface information containing user operation information, and outputs the interface information to the display unit 111 so that the interface information is displayed thereon.

The display unit 111 is a display unit formed, for example, of an LCD, and displays a currently acquired image (through image), the image stored in the memory 105, and the like via the imaging unit 101. Note that, the display unit 111 has a touch panel function so that the user operation information can be input. In other words, the display unit 111 also has a function of the user interface unit 104 in FIG. 1.

The motion amount detection unit 113 detects, for example, differences between frames of the plurality of images captured by the imaging unit 101 and stored in the memory 105 so as to detect a motion amount of the captured images.

Note that, the processing units are connected to the bus 112 so that the image data and control information such as a processing command are exchanged via the bus 112.

[2. Image Capture Process and Image Recording Process According to First Embodiment]

Next, an image capture process and an image recording process that are executed by the imaging apparatus according to a first embodiment of the present disclosure are described.

As described with reference to FIG. 1, the frame images of a moving image captured by the imaging unit 101 are subjected to image processes such as the demosaic process and the white balance adjustment process in the image processing unit 102, and then sequentially stored in the memory 105 such as the ring buffer.

The memory 105 serves as the temporary recording region for the images, and is configured, for example, to be capable of storing a plurality of frame images corresponding to a moving image for approximately 8 seconds.

For example, image frames in a predetermined capture time period of the "snap moving image capture" described above, specifically, in a time period of 8 seconds can be stored.

Thus, the memory 105 cannot store a moving image that is longer than a predetermined time period.

The imaging apparatus according to the first embodiment of the present disclosure is configured to be capable of changing segments of the moving image stored in the memory 105 in accordance with an operation by the user.

First, images from a time point of a start of capture by the user are sequentially stored in the memory 105. When the user does not perform the operation in a predetermined capture time period T of, for example, 8 seconds, which is predetermined in accordance with capacity of the memory 105, image frames in a time period of the 8 seconds after the start of the capture are stored in the memory, and then the image capture process is completed.

The imaging apparatus according to the first embodiment of the present disclosure deletes part of the image segments recorded in the memory 105 in response to an instruction (shift instruction) that is issued from the user to the imaging apparatus under a state in which images have not been stored up to an upper limit of the capacity of the memory 105. In this way, additional captured images can be stored in the deleted region. In other words, a shift process of sequentially shifting the segments of the images that are stored in the memory 105 in accordance with the operation by the user can be executed.

Specifically, a capture start time point is set, for example, to T0 so that images between the capture start time point T0 and a time point T8 that is 8 seconds after the capture start time point T0 can be stored in the memory 105.

In this configuration, the images stored in the memory 105 can be changed through the shift process by the user as follows:

(1) When the shift process is not executed,
the images recorded in the memory correspond to frames of images that are captured between T0 and T8.

(2) When the shift process is executed at a time point T1,
the images recorded in the memory correspond to frames of an image specified at T1 and subsequent images that are captured in a predetermined time period (8 seconds).

(3) When the shift process is executed at a time point T2,
the images recorded in the memory correspond to frames of an image specified at T2 and subsequent images that are captured in a predetermined time period (8 seconds).

Subsequently, also at a time point T3 and subsequent time points, in accordance with shift timings, the captured images prior to an image specified at each of the shift timings are deleted from the memory, and images in a predetermined time period (8 seconds) subsequent to the specified image as a new recording start image can be stored in the memory 105.

Figure 2:
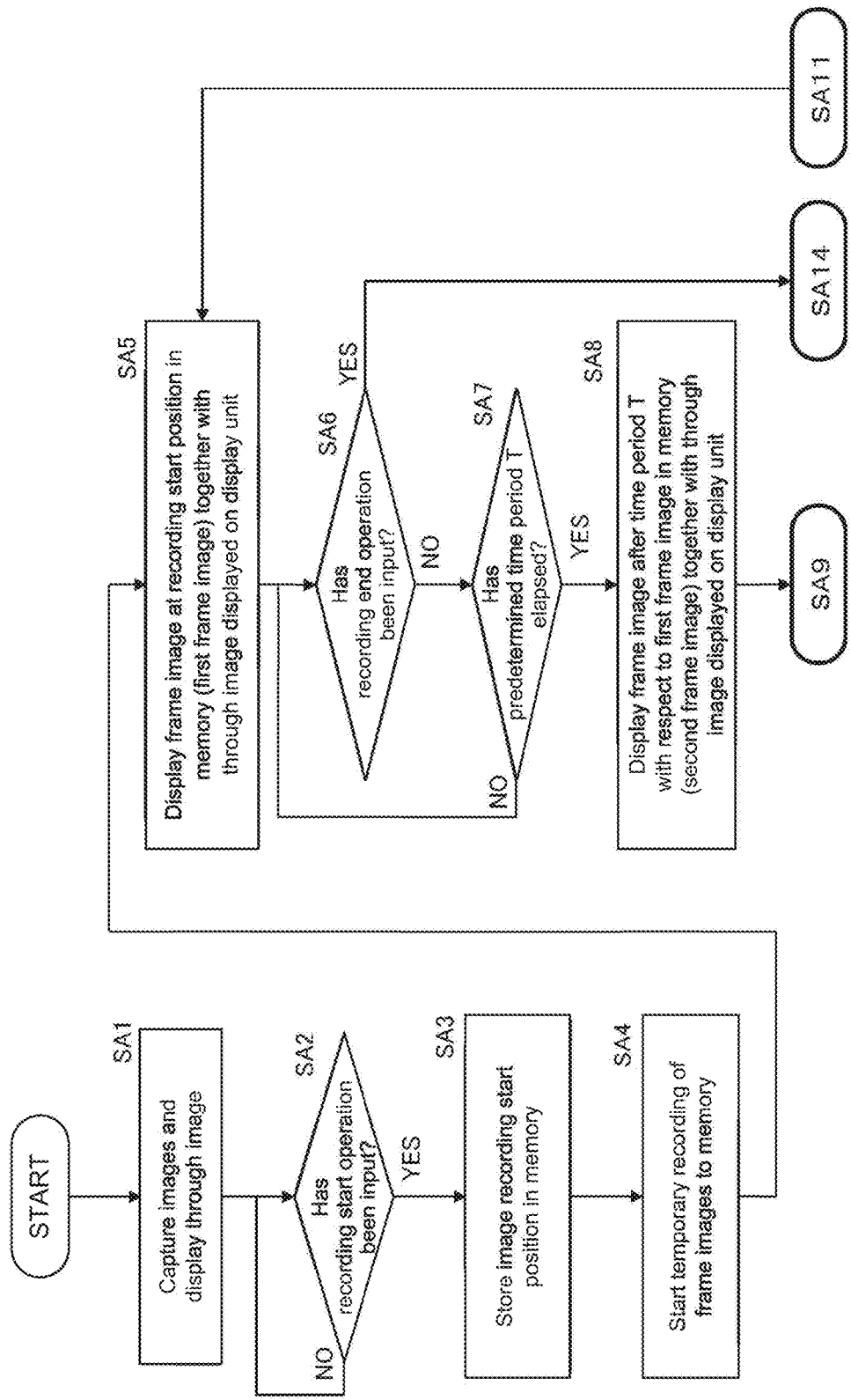
FIG. 2 is a flowchart showing a sequence of an image capture process and an image recording process that are executed by the imaging apparatus.
Figure 3:
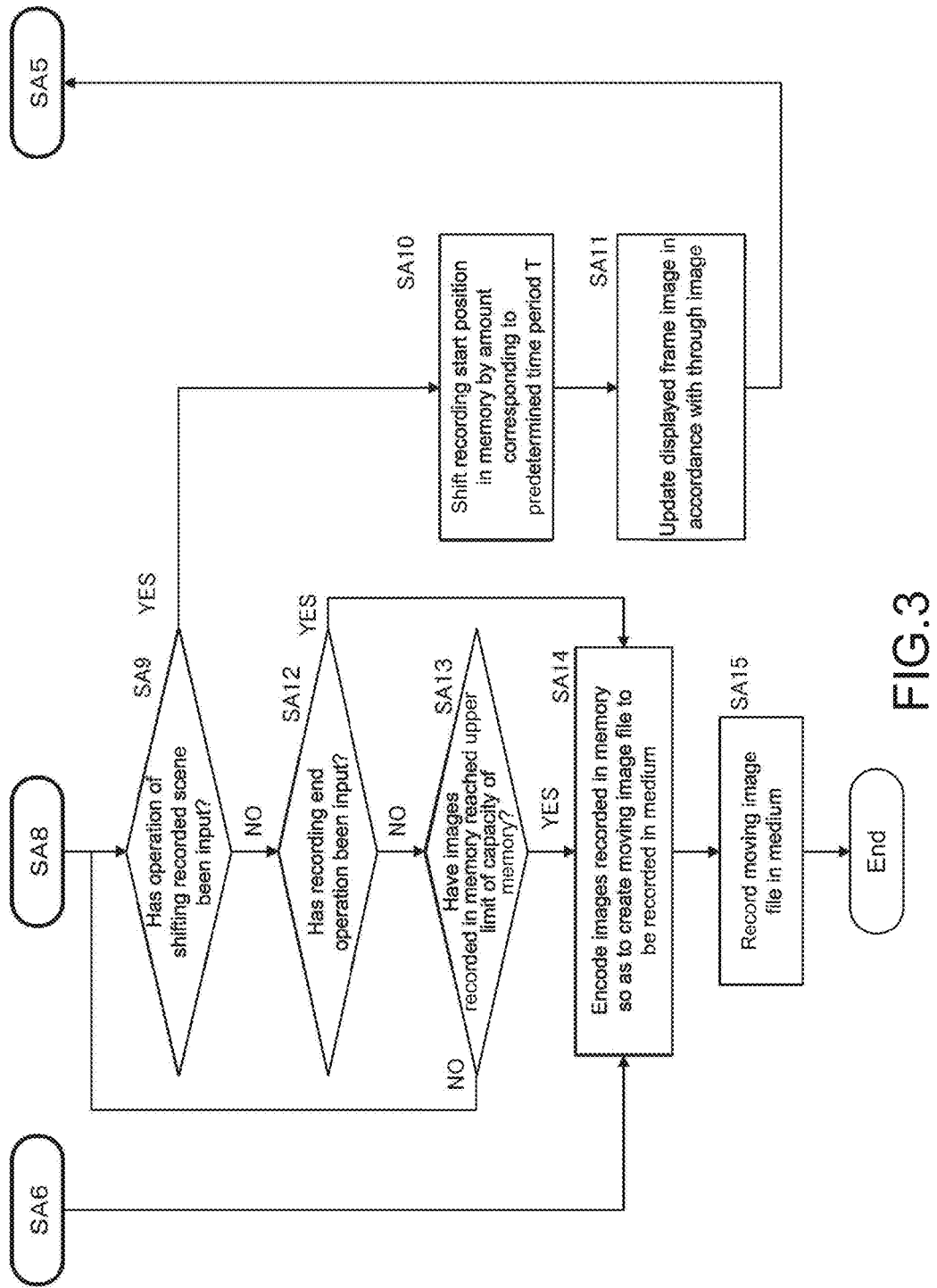
FIG. 3 is another flowchart showing the sequence of the image capture process and the image recording process that are executed by the imaging apparatus.

With reference to flowcharts shown in FIGS. 2 and 3, a sequence of the processes is described in detail.

Note that, the processes in a flow shown in FIGS. 2 and 3 are executed under control by the CPU of the control unit 103 of the imaging apparatus. The CPU controls the processes in accordance with the programs that predetermine the sequence of the processes along with the flow.

Note that, the processes along with the flow shown in FIGS. 2 and 3 include a capture process using a temporarily recording process in the memory 105, specifically, a process that is executed in a case where images are captured in accordance with a configuration mode selected by the user, such as the "snap moving image capture" described above and high-speed moving image capture.

In the following, processes of steps in the flowcharts shown in FIGS. 2 and 3 are sequentially described.

(Step SA1)

First, in Step SA1, the images input through the lens of the imaging unit 101 are subjected to the image processes such as the demosaic process of setting pixel values of red, green, and blue with respect to pixels in the image processing unit 102. Further, in the display processing unit 110, the images are subjected, for example, to the size conversion in accordance with an output size of the display processing unit 110, and then output to the display unit 111.

Note that, the images output to the display unit 111 at this time point are mere observed images input through the lens of the imaging unit 101, which have not yet been subjected to the capture process. Whether or not the capture process is executed, the display unit 111 displays a currently input image, and this image is referred to as the "through image."

The user (photographer) observes the "through image," determines a capturing direction and a capture start timing, and then presses a recording start button (REC). In this way, a moving image starts to be captured.

(Step SA2)

Next, in Step SA2, the control unit 103 determines whether or not a recording start instruction has been input by the user. Specifically, the control unit 103 determines whether or not the recording start button (REC) has been pressed.

In a case where the recording start instruction has not yet been input by the user, the determination in Step SA2 is "No." As a result, the flow stays in Step SA2 until the input of the recording start instruction by the user.

Meanwhile, in a case where input of the recording start instruction by the user has been detected, the determination in Step SA2 is "Yes," and the flow proceeds to Step SA3.

(Step SA3)

In Step SA2, when the input of the recording start instruction by the user is detected, a moving image starts to be captured from that time point. Image frames of the moving image are subjected to the image processes in the image processing unit 102, and then sequentially input to the memory 105.

In Step SA3, an image recording start position (address) in the memory 105 is acquired, and is stored in an accessible memory in the control unit 103.

An example of the through image displayed on the display unit 111, and an example of the image recording process in the memory 105 are described with reference to FIGS. 4A and 4B.

Figure 4A:
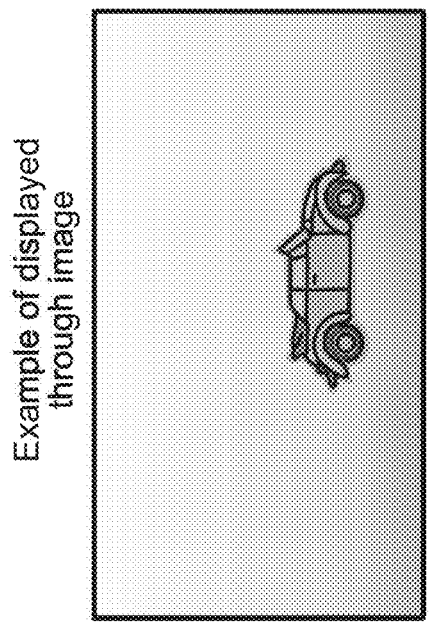
FIGS. 4A and 4B are explanatory views of an example of an image displayed on a display unit of the imaging apparatus, and an example of image data items that are stored in a memory.

FIG. 4A shows the example of the through image displayed on the display unit 111. Images of an automobile traveling from the left to the right are input through the lens of the imaging unit 101, subjected to the image processes in the image processing unit 102, and output to the display unit 111 via the display processing unit 110. The through image that is displayed in Step SA1 in the flow of FIG. 2 is displayed as, for example, in FIG. 4A.

In Step SA2 in the flow of FIG. 2, when the recording start instruction is input by the user, the images input through the lens of the imaging unit 101 are subjected to the image processes in the image processing unit 102, displayed on the display unit 111, and then recorded in the memory 105 as a temporarily recording region for the images.

Figure 4B:
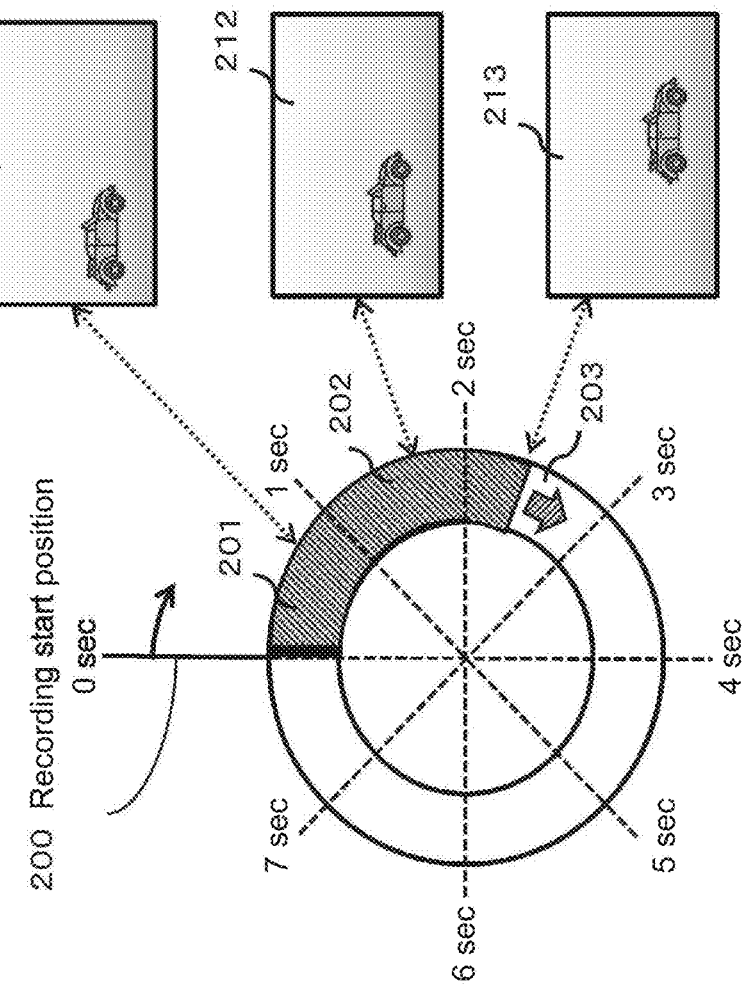

FIG. 4B shows the example of the image recording process in the memory 105. The example shown in FIG. 4B is an example of the memory 105, which has a ring buffer configuration.

As shown, for example, in FIG. 4B, the memory 105 as a ring buffer records the input images sequentially from a specific recording start position 200. In the configuration of the example shown in FIG. 4B, the input images are recorded sequentially clockwise from the recording start position 200.

In Step SA3 in the flow of FIG. 2, a memory address of the recording start position 200 shown in FIG. 4B is acquired and stored in the memory in the control unit 103.

In a memory region 201 shown in FIG. 4B, image data items of image frames in a time period of from 0 seconds to 1 second after a start of recording are recorded. For example, when images are captured at a frame rate of 30 fps, that is, 30 images are captured per second, data items of the 30 images are recorded in the memory region 201. An image 211 shown in FIG. 4B is a representative one of the images stored in the memory region 201.

Further, in a memory region 202, image data items of image frames in a time period of from 1 second to 2 seconds after the start of the recording are recorded. When images are captured at the frame rate of 30 fps, data items of the 30 images are recorded also in the memory region 202. An image 212 shown in FIG. 4B is a representative one of the images stored in the memory region 202.

The same applies hereinafter. In a memory region 203, image data items of image frames in a time period of from 2 seconds to 3 seconds after the start of the recording are recorded. An image 213 shown in FIG. 4B is a representative one of the images stored in the memory region 203.

Subsequently, the image data items are recorded sequentially clockwise in the ring buffer. With this configuration, image data items in a time period of 8 seconds in total can be recorded up to the recording start position 200.

In a case where the shift process described above is not executed, the memory 105 records images in a time period of the 8 seconds from the start of the recording, and the recording process is completed.

Note that, when the user executes the shift process under the state in which image data items have not been stored up to the upper limit of the memory 105, a process of setting a memory region that has already stored images, for example, the memory region 201 shown in FIG. 4B, as a region to be overwritten by additional captured images is executed. In other words, the memory region 201 is reset as a region to which images that are captured in a time period of from 8 seconds to 9 seconds after the start of the recording are written.

Specifically, when such a shift process is executed, the memory 105, which has been set to store images in the time period of from 0 seconds to 8 seconds after the start of the capture until the shift process is executed, is updated to store images in a time period of from 1 second to 9 seconds after the start of the capture.

The shift process can be executed at any timing as many times as necessary until the images are recorded up to the upper limit of the storage capacity of the memory. Thus, the user can store images in various capture time periods as the user likes in the memory 105 by executing the shift process at any time.

Referring back to the flow of FIG. 2, the sequence of the processes is further described.

(Step SA4)
In Step SA2, when the recording start instruction input by the user is detected, the moving image starts to be captured from that time point. Further, in Step SA3, the image recording start position (address) in the memory 105 is acquired, and is stored in the accessible memory in the control unit 103. This address is an address of the recording start position 200 in FIG. 4B.

In Step SA4, the captured images are stored in the memory 105 sequentially from the recording start position 200 in FIG. 4B.

(Step SA5)
Next, in Step SA5, a frame image at a time point of the start of the recording, which is stored in the memory 105, is displayed while being superimposed on the "through image" that is a currently input image displayed on the display unit 111. This frame image is a first frame image that is acquired first after the start of the recording.

FIG. 5A shows a specific display example of the display unit 111 at the time point of Step SA5, and an example of the data stored in the memory 105.

As shown in FIG. 5A, the first frame image at the time point of the start of the recording, which is stored in the memory 105, is displayed as a first frame image 251 in an upper partial region of a through image 250 that is a currently captured image.

(Step SA6)
In Step SA6, whether or not a recording end instruction has been input by the user is determined. Specifically, whether or not re-pressing of the recording button (REC) by the user has been detected is determined. A recording stop instruction is input by the re-pressing of the recording button (REC) during the recording. When the re-pressing of the recording button (REC) is detected, the determination in Step SA6 is "Yes," and the flow proceeds to Step SA14.

Meanwhile, when the input of the recording end instruction by the user is not detected, the flow proceeds to Step SA7.

(Step SA7)
Next, in Step SA7, the control unit 103 determines whether or not the predetermined time period [T] has elapsed from the capture start time point.

The predetermined time period [T] corresponds to a capture time interval between the first frame image displayed on the display unit 111 and a second frame image to be subsequently displayed.

When the elapse of the predetermined time period [T] from the capture start time point is determined in Step SA7, the flow proceeds to Step SA8, or to returns to Step SA6 when the elapse of the predetermined time period [T] is not determined.

(Step SA8)
When the elapse of the predetermined time period T is detected in Step SA7, a frame image that is captured after the elapse of the time period [T] from the capture start time point is displayed on the display unit 111 in Step SA8.

FIG. 5B shows another specific display example of the display unit 111 at the time point of Step SA8, and another example of the data stored in the memory 105.

As shown in FIG. 5B, the first frame image 251, which is stored in the memory 105 and the first frame image at the time point of the start of the recording, is displayed in the upper partial region of the through image 250 that is a currently captured image. In addition, in Step SA8, a frame image that is captured after the elapse of the time period [T] from the capture start time point is displayed as a second frame image 252.

Note that, in the examples shown in FIGS. 5A and 5B, the time period [T] is set to 1 second.

In the display example shown in FIG. 5B, the first frame image 251 and the second frame image 252 are displayed while being superimposed on the through image 250. However, this display example is merely one example, and the display process may be executed in other ways. For example, without being superimposed on each other, the through image 250, the first frame image 251, and the second frame image 252 may be displayed in separate regions.

(Step SA9)
Next, in Step SA9, the control unit determines whether or not the input of the shift instruction from the user with respect to the recorded images has been detected.

An example of the shift instruction by the user is described with reference to FIG. 6.

FIG. 6 shows the example of the shift instruction by the user. The display unit 111 is formed of a touch panel configured to detect a contact position of a finger of the user. In other words, the display unit 111 also has a function of the user interface unit 104.

Note that, the shift instruction via the touch panel is merely one example of the shift instruction. Alternatively, the shift instruction may be issued by pressing a shift instruction button such as an operation button.

As shown in FIG. 6, in order to issue the shift instruction, the user touches a region of the second frame image 252. In response to this shift instruction, a process of shifting the recording start position in the memory 105 by an amount corresponding to the predetermined time period T is executed. This process enables images preceding the second frame image 252 to be deleted from the images that have been stored in the memory 105. This update process on the data stored in the memory is executed as a process of Step SA10 described below.

When the shift instruction by the user is detected in Step SA9, the flow proceeds to Step SA10, or to Step SA12 when not detected.

(Step SA10)

In Step SA10, the process of shifting the recording start position in the memory by the amount corresponding to the predetermined time period T is executed. This process enables the captured images preceding the second frame image 252 to be deleted from the images that have been stored in the memory 105.

A specific processing example of the memory update process is described with reference to FIGS. 7A and 7B. FIGS. 7A and 7B show the following.

An Example of the process in the shift instruction by the user (Left part) State in which the memory (ring buffer) 105 has not yet been updated (before the shift instruction)

(Right part) State in which the memory (ring buffer) 105 has been updated (after the shift instruction)

Note that, in the example shown in FIGS. 7A and 7B, the shift instruction is issued at a time point after elapse of 7 seconds from the start of the image recording in the memory 105.

As shown in FIG. 7A, the display unit 111 displays the first frame image 251 at the time point of the start of the recording (start of the capture process), and the second frame image 252 at the time point after elapse of the predetermined time period T from the start of the recording (start of the capture process).

Note that, in this example, the predetermined time period T is set to 1 second.

As shown in FIG. 7B left part, an image data item corresponding to the first frame image 251 is recorded at a recording start position 260 in the memory (ring buffer) 105 before the memory update, which is located in a memory region 261 shown in FIG. 7B left part.

Further, as shown in FIG. 7B left part, an image data item corresponding to the second frame image 252 is recorded at a position corresponding to elapse of [1 second] in the memory (ring buffer) 105 before the memory update, which is located in a memory region 262.

As shown in FIG. 7B left part before the memory update, at a time point when the user issues the shift instruction, in other words, at the time point after the elapse of the 7 seconds from the start of the image recording, the memory 105 has already stored images in a time period of from 0 seconds to the 7 seconds after the start of the image recording. Thus, as shown in FIG. 7B left part, only a memory region 263 corresponding to the time point of the 7 seconds and subsequent time points in the memory is a free region.

In FIG. 7B left part, the "shaded part" of the memory regions indicates image data storage regions, and the "blank part" thereof indicates an image data storable region.

In this state, as shown in FIG. 7A, when the user touches the display region of the second frame image 252 after the elapse of the predetermined time period T of 1 second from the start of the recording (start of the capture process), the instruction of the shift process is input. Then, the update process in the memory 105 is executed under the control by the control unit 103 and the memory control unit 106.

The state shown in FIG. 7B right part after the memory update corresponds to a state of the memory after the shift process. The memory 105 is updated by executing the following processes (1) and (2).

(1) Shifting the recording start position to a recording position of an image specified by the shift instruction (predetermined time period T of 1 second).

(2) Setting recording regions for captured images preceding the image specified by the shift instruction as deletable regions, that is, as writable regions for subsequent captured images.

In the process (1), a recording start position is shifted from the initial recording start position 260 shown in FIG. 7B left part to the recording position of the image specified by the shift instruction (predetermined time period T of 1 second). In this way, a recording start position 270 is set as shown in FIG. 7B right part.

In the process (2), as shown in FIG. 7B right part, the recording regions for the captured images preceding the image specified by the shift instruction, specifically, the memory region 261 indicated as a dotted region in FIG. 7B right part is set as the deletable region, that is, as a region to be overwritten by subsequent captured images.

This memory update process enables, as shown in FIG. 7B right part, in the memory 105 after the update, the memory region 261 to be set as an additional image writable region in addition to the memory region 263. With this, images in a time period of from 7 seconds to 9 seconds after a time point of an initial start of image recording (start of capture) can be written.

In other words, images in a time period of from 7 seconds to 8 seconds after the time point of the initial start of the image recording (start of capture) can be written in the memory region 263, and images in a time period of from 8 seconds to 9 seconds after the time point of the initial start of the image recording (start of capture) can be written by executing the overwriting process on the memory region 261 in which images in a time period of from 0 seconds to 1 second have been written.

Note that, although the images in the time period of from 0 seconds to 1 second after the start of the capture are deleted through this process, finally, images in a time period of 8 seconds from 1 second to 9 seconds after the start of the capture can be maintained as recorded data items in the memory 105.

In other words, by the shift process shown in FIGS. 7A and 7B, memory stored images preceding the shift process, that is, images in a time period of from 0 seconds to 8 seconds after the capture start time point can be changed into memory stored images after the shift process, that is, images in the time period of from 1 second to 9 seconds after the capture start time point.

By the process of Step SA10 in the flowchart shown in FIG. 3, the state shown in FIG. 7B left part before the memory update is shifted to the state shown in FIG. 7B right part after the memory update.

Note that, as shown in FIGS. 7A and 7B, the memory 105 stores image data items in time series sequentially clockwise from the recording start position in the memory. In this way, images can be recorded up to the recording start position.

By the shift process, the recording start position in the memory is shifted to a recording position of an image that is subsequent to an initial recording start position. By this process, a recording region for preceding captured images in memory regions that precede a newly set recording start position is set as a deletable region. In this way, a new recording region for subsequent captured images is additionally set.

Note that, the shift process can be repeatedly executed at any timing, and memory stored images can be sequentially changed, for example, in the following pattern.

(1) Images in a time period of from 0 seconds to 8 seconds
(2) Images in a time period of from 1 second to 9 seconds
(3) Images in a time period of from 2 seconds to 10 seconds
(4) Images in a time period of from 3 seconds to 11 seconds Subsequently, in the same way, the memory stored images can be shifted into subsequent capture time periods.

Note that, the time intervals (1), (2), (3), and subsequent intervals are each predetermined in accordance with the preset predetermined time period T. In this example, the predetermined capture time period T is set to 1 second.

(Step SA11)

The flow of FIG. 3 is described again. In Step SA10, the memory update described with reference to FIGS. 7A and 7B, that is, the memory update as shown in FIG. 7B is executed. Then, in Step SA11, the update process on the image displayed on the display unit 111 is executed. Specifically, a frame image, which is displayed to show the memory recorded image while being superimposed on the "through image" that is a current image, is updated.

After completion of the process of Step SA11, the flow returns to Step SA5 so that the display process on the updated image is executed.

An example of the update process on the frame images displayed on the display unit 111 is described with reference to FIG. 8. FIG. 8 shows the following.

(Left part) Images displayed on the display unit 111 before the update (at the time of execution of the shift process)
(Right part) Images displayed on the display unit 111 after the update (after the execution of the shift process)

The images displayed on the display unit 111 before the update (at the time of execution of the shift process) in FIG. 8 left part are the same as the displayed images shown in FIGS. 6, 7A, and 7B.

An image at a time point of a start of capture (start of recording) is displayed as the first frame image 251, and an image after elapse of the predetermined time period T of 1 second from the start of the capture (start of the recording) is displayed as the second frame image 252 while being superimposed on the through image 250.

In this state, the user executes the shift process of specifying the second frame image 252.

By this shift process, captured images preceding the second frame image 252, specifically, moving image frames in a time period corresponding to from the first frame image 251 to an image preceding the second frame image 252 are set as deletable images. In other words, as described above with reference to FIGS. 7A and 7B, the images stored in the memory region 261 are set as deletion objects by the update process in the memory 105.

In response to the update of the memory 105, the display on the display unit 111 is also updated. In other words, a display changing process of FIG. 8 is executed.

A first frame image (after the update) 281 shown in FIG. 8 right part is an image that corresponds to a new recording start position updated by the shift process. In other words, the first frame image 281 is stored at the new recording start position 270 shown in "FIG. 7B right part after the memory update."

Note that, the first frame image (after the update) 281 shown in FIG. 8 right part is the same as the second frame image (before the update) 252 that is a shift specifier image shown in FIG. 8 left part.

A second frame image (after the update) 282 shown in FIG. 8 right part is an image that is captured after elapse of the predetermined time period T with respect to the first frame image (after the update) 281 shown in FIG. 8 right part. In this example, the predetermined time period T is set to 1 second, and hence the second frame image (after the update) 282 shown in FIG. 8 right part corresponds to an image that is captured 1 second subsequent to the first frame image (after the update) 281 shown in FIG. 8 right part.

In this way, the images that are displayed on the display unit are updated always in combinations of images of the following two types:

(1) First frame image corresponding to an image at a latest recording start position
(2) Second frame image corresponding to an image after elapse of the predetermined time period T with respect to the image at the latest recording start position.

This process is a display image update process corresponding to Steps SA11 and SA5 in the flow shown in FIG. 3.

(Step SA12)

Referring back to FIG. 3, the sequence of the processes is further described.

When the input of the shift instruction by the user is detected in Step SA9, as described above, Steps SA10 and SA11 are executed so as to execute the update processes in the memory 105 and the display unit 111.

Meanwhile, when the input of the shift instruction by the user is not detected in Step SA9, the flow proceeds to Step SA12.

In Step SA12, whether or not the recording end instruction has been input by the user is determined. The recording end instruction can be input in various ways. For example, the re-pressing of the recording operation button (REC) during the execution of the recording process is determined as the recording end instruction.

When the input of the recording end instruction by the user is detected in Step SA12, the flow proceeds to Step SA14, or proceeds to Step SA13 when not detected.

(Step SA13)

When the input of the recording end instruction by the user is not detected in Step SA12, the flow proceeds to Step SA13, and whether or not the recorded images in the memory 105 have reached the upper limit of the storage capacity of the memory 105 is determined.

When the upper limit of the storage capacity is determined to have been reached, the flow proceeds to Step SA14. In a case where the upper limit of the storage capacity has not yet been reached, the flow returns to Step SA9.

(Step SA14)

In Step SA13, when the recorded images in the memory 105 are determined to have reached the upper limit of the storage capacity of the memory 105, the flow proceeds to Step SA14.

In Step SA14, the encoding process with the codec 107 is executed on the images stored in the memory 105. With this, a moving image data file to be stored in the storage 108 as a final recording medium for image data is created.

Note that, also when the recording end instruction from the user is detected in Step SA6 or SA12 described above, the same process is executed in Step SA14.

(Step SA15)

In Step SA15, the moving image file to be recorded in a medium, which is created in Step SA14, is stored in the storage 108. Note that, examples of the storage 108 include recording media such as an SD card.

[3. Example of Shift Process and Image Recording Process in Memory]

A specific example of the update process on the recorded images in the memory 105 in the case where the shift process described with reference to the flowcharts shown in FIGS. 2 and 3 is executed is described with reference to FIG. 9.

Figure 9:
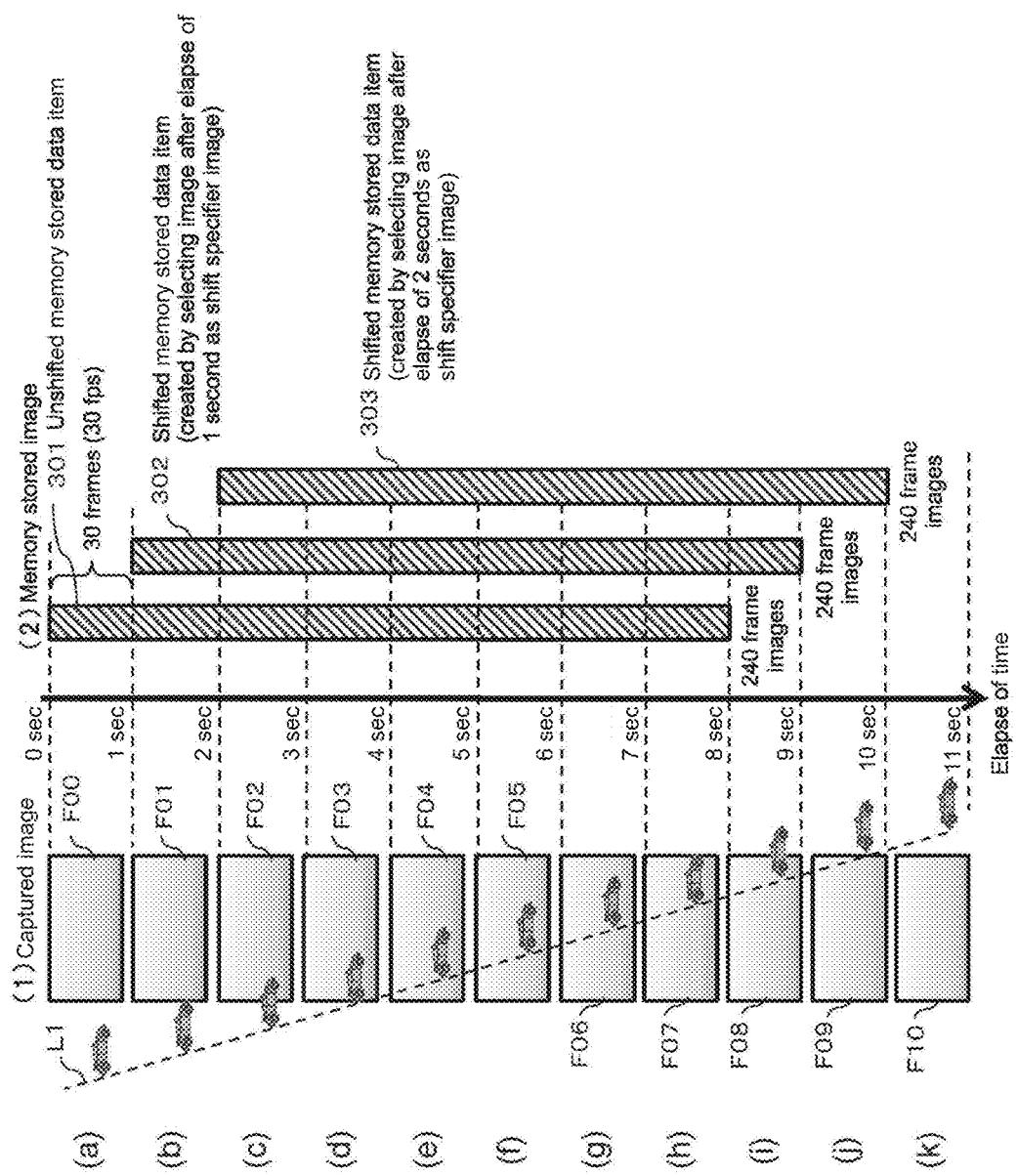
FIG. 9 is an explanatory chart of a correspondence between an update process on memory stored data items along with the shift process and stored image data items.

FIG. 9 shows, from top to bottom, elapse of time (0 seconds to 11 seconds) from the capture start time point, in other words, shows the following data items along with the elapse of time:

(1) Captured images
(2) Memory stored images

FIG. 9(1) shows captured images F00 to F10 each captured in the predetermined time period T of 1 second.

The captured image F00 is captured at a capture start time point (0 seconds).

The captured image F01 is captured at a time point of 1 second after a start of capture.

The captured image F02 is captured at a time point of 2 seconds after the start of the capture.

Subsequently, in the same way, the captured images F03 to F10 are captured respectively at time points of 3 seconds to 10 seconds after the start of the capture.

Note that, a photographic subject in the captured images is an automobile traveling from the left to the right.

A dotted line L1 connects rear ends of the automobile in the captured images to each other.

FIG. 9(2) shows examples of the following three types of memory stored data items.

(2-1) Unshifted memory stored data item 301
(2-2) Shifted memory stored data item 302 (created by selecting an image after elapse of 1 second as a shift specifier image)
(2-3) Shifted memory stored data item 303 (created by selecting an image after elapse of 2 seconds as a shift specifier image)

The memory 105 stores any of the image data items 301 to 303 in response to the shift process by the user.

Note that, the data items 301 to 303 are each a data item of successively captured images in a time period of 8 seconds.

On a premise that the images are captured at a frame rate of 30 fps, that is, 30 frame images are captured per second, 30 frames of the captured images in time periods of 1 second of from 0 seconds to 1 second, 1 second to 2 seconds, 2 seconds to 3 seconds, and subsequent time periods are obtained. In other words, the recorded images each correspond to 30 frames per second. Therefore, the total recorded images in the capacity of the memory in a time period of 8 seconds correspond to 30×8=240 frame images.

The unshifted memory stored data item 301 is an example of the data items stored in the memory 105 in a case where the image data items are recorded up to the upper limit of the memory 105 without ever executing the shift process since the start of the capture. In this way, when the shift process is not executed ever since the start of the capture, successively captured images corresponding to 240 frames in the time period of 8 seconds from the capture start time point (0 seconds) to 8 seconds after the start of the capture are stored in the memory 105. Then, the capture process is completed.

The shifted memory stored data item 302 (created by selecting the image after the elapse of 1 second as a shift specifier image) is another example of the data items stored in the memory 105 in a case where a shift process in which the image after the elapse of 1 second is selected as a shift specifier image is executed after the start of the capture.

In this case, images in a time period of 1 second from the capture start time point (0 seconds) to 1 second immediately preceding the image after the elapse of 1 second, which is selected as a shift specifier image, are set as deletable images.

Thus, successively captured images corresponding to 240 frames in a time period of 8 seconds from 1 second to 9 seconds after the start of the capture are stored in the memory 105. Then, the capture process is completed.

Similarly, the shifted memory stored data item 303 (created by selecting the image after the elapse of 2 seconds as a shift specifier image) is still another example of the data items stored in the memory 105 in a case where a shift process in which the image after the elapse of 2 seconds is selected as a shift specifier image is executed after the start of the capture.

In this case, images in a time period of 2 seconds from the capture start time point (0 seconds) to 2 seconds immediately preceding the image after the elapse of 2 seconds, which is selected as a shift specifier image, are set as deletable images.

Thus, successively captured images corresponding to 240 frames in a time period of 8 seconds from 2 seconds to 10 seconds after the start of the capture are stored in the memory 105. Then, the capture process is completed.

Note that, after the start of the capture, the following two captured images are displayed together with the through image on the display unit 111.

The frame image F00 shown in FIG. 9(1), which serves as a first frame image.

The frame image F01 shown in FIG. 9(1), which serves as a second frame image.

When a shift process of specifying the second frame image (frame image F01) out of those two images is executed, setting of the memory stored data items is switched to that of the shifted memory stored data item 302 in FIG. 9(2).

Further, as a result of this shift process, the following two captured images are displayed together with the through image on the display unit 111.

The frame image F01 shown in FIG. 9(1), which serves as the first frame image.

The frame image F02 shown in FIG. 9(1), which serves as the second frame image.

When another shift process of specifying the second frame image (frame image F02) out of those two images is executed, setting of the memory stored data items is switched to that of the shifted memory stored data item 303 in FIG. 9(2).

Subsequently, shift processes are executed in the same way so as to sequentially shift the memory stored data items afterward by the predetermined time period T.

In the example shown in FIG. 9, the image of the automobile as the photographic subject is not included in the images in the time period of from 0 seconds to 1 second in the unshifted memory stored data item. A leading end of the automobile as the photographic subject is contained first in the frame image F01.

When the frame image F01 is displayed as the second frame image on the display unit 111, it can be checked that the automobile as the photographic subject is not contained in images preceding the frame image F01.

Based on a result of the check, the user can execute a shift process of excluding the images in the time period of from 0 seconds to 1 second after the start of the capture from recording objects so as to set images at a time point of 8 seconds and time points subsequent thereto after the start of the capture as additional recording objects.

In this way, the user (photographer) can grasp unnecessary images with reference to the images displayed on the display unit after the start of the capture, and then select an optimum segment containing images-to-be-recorded, to thereby set images-to-be-recorded.

[4. Example of Image Displayed on Display Unit]

As described above in this embodiment, in order that the user can grasp deletable images in the shift process, the display unit 111 displays two frame images at an interval of the predetermined time period T together with the through image.

Specifically, for example, the first frame image 251 and the second frame image 252 described with reference to FIG. 6 are displayed.

When the user executes the shift process while those images are displayed, images between the first frame image 251 and the second frame image 252 are set as deletion objects.

The displayed images described with reference to FIG. 6 are merely one example of a display embodiment of two images showing a deletion time period. Another display embodiment is described with reference to FIGS. 10A, 10B, and 10C.

Figure 10A:
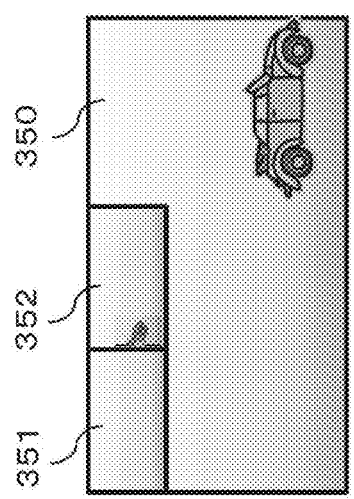
FIGS. 10A, 10B, and 10C are explanatory views of examples of data items displayed on the display unit.

FIG. 10A shows a display example similar to the display example described with reference to FIG. 6.

In this example, two frame-image display regions are set in the upper left of a through image 350 that is a currently captured image.

In this example, an image at a time point of a start of a time period T to be deleted, and an image immediately after an end of the time period T are displayed adjacent to each other respectively as a first frame image 351 and a second frame image 352.

Figure 10B:
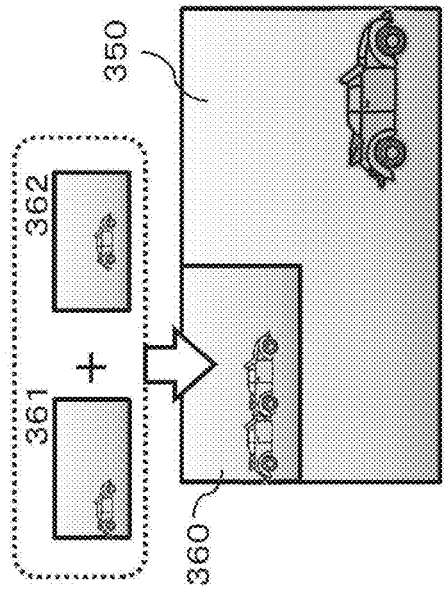

FIG. 10B shows an example in which a single frame-image display region 360 is set in a region in the upper left of the through image 350 that is a currently captured image.

The frame-image display region 360 displays an image 361 at the time point of the start of the time period T to be deleted, an image 362 immediately after the end of the time period T, and images therebetween in a superimposed manner.

Note that, examples of the images displayed in a superimposed manner may include all the frame images in the time period T, or may include images obtained by thinning out frames and superimposing images corresponding, for example, to ⅕ frames of all the frames on each other. Alternatively, only the image 361 at the time point of the start of the time period T to be deleted, and the image 362 immediately after the end of the time period T may be displayed while being superimposed on each other.

For example, in a case where the photographic subject has moved between the time point of the start and the time point of the end of the time period T, the motion of the active photographic subject can be checked as in the frame-image display region 360 shown in FIG. 10B.

Further, in a case where the photographic subject has not moved at all between the time point of the start and the time point of the end of the time period T, the frame-image display region 360 displays a motionless photographic subject image similar to a single still image. When the frame-image display region 360 displays such an image similar to a still image, the user can immediately determine that the images in this time period T correspond to a motionless moving-image segment.

In other words, with reference to the image displayed in the frame-image display region 360, whether or not the moving image within the time period T is motional can be relatively easily determined. Based on this determination result, whether or not to set the images in the time period as deletion objects can be determined.

Note that, in the configuration shown in FIG. 10B, the user can issue a shift instruction only by touching the frame-image display region 360. By this touch process, the images between the time point of the start and the time point of the end of the time period T, which are displayed in the frame-image display region 360, are set as deletion objects.

In response to the execution of this shift process, the frame-image display region 360 is updated, and switched to display images obtained by superimposing images at a time point of a start and a time point of an end of a subsequent time period T.

Figure 10C:
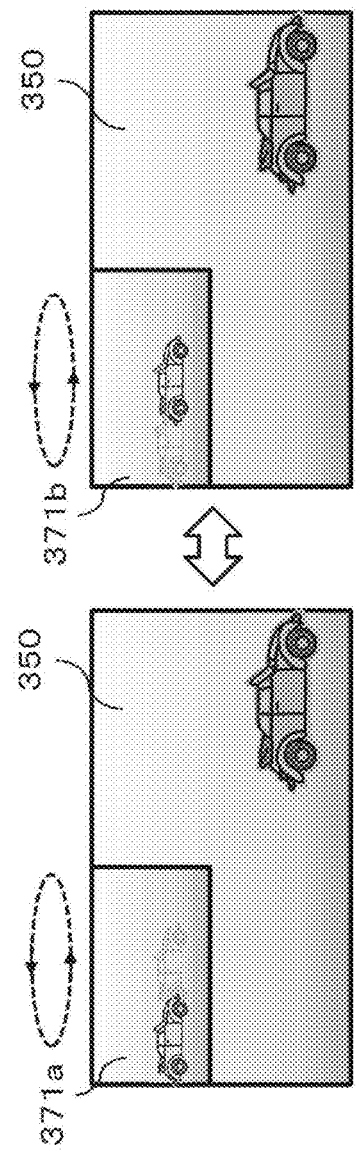

FIG. 10C also shows examples in which single frame-image display regions 371a and 371b are each set in a region in the upper left of the through image 350 that is a currently captured image.

The frame-image display regions 371a and 371b each successively display an image at the time point of the start of the time period T to be deleted, an image immediately after the end of the time period T, and images therebetween. In other words, a moving image is displayed.

Note that, examples of the displayed images may include all the frame images in the time period T, or may include a moving image containing images corresponding, for example, to ⅕ frames of all the frames on each other. Alternatively, only the image at the time point of the start of the time period T to be deleted, and the image immediately after the end of the time period T may be displayed alternately to each other.

FIG. 10C left part shows an example of the image displayed at the time point of the start of the time period T to be deleted, and FIG. 10C right part shows an example of the image displayed at the time point of the end of the time period T to be deleted.

Also in the display embodiment of FIG. 10C, in the case where the photographic subject has moved between the time point of the start and the time point of the end of the time period T as in the display mode of FIG. 10B, the frame-image display regions 371a and 371b in FIG. 10C display different images. Meanwhile, in the case where the photographic subject has not moved at all between the time point of the start and the time point of the end of the time period T, the frame-image display regions 371a and 371b in FIG. 10C display the same image. As a result, a motionless photographic subject image similar to a single still image is displayed.

When the frame-image display regions 371a and 371b each display such an image similar to a still image, the user can immediately determine that the images in this time period T correspond to a motionless moving-image segment.

In other words, with reference to the image displayed in the frame-image display region 371a or 371b, whether or not the moving image within the time period T is motional can be relatively easily determined. Based on this determination result, whether or not to set the images in the time period as deletion objects can be determined.

Note that, in the configuration shown in FIG. 10C, the user can issue a shift instruction only by touching the frame-image display region 371a or 371b. By this touch process, the images between the time point of the start and the time point of the end of the time period T, which are displayed in the frame-image display region 371a or 371b, are set as deletion objects.

In response to the execution of this shift process, the frame-image display region 371a or 371b is updated, and switched to display images between a time point of a start and a time point of an end of a subsequent time period T.

[5. Image Capture Process and Image Recording Process According to Second Embodiment]

Next, an image capture process and a recording process that are executed by the imaging apparatus according to a second embodiment of the present disclosure are described.

In the first embodiment described above, a shift position that can be selected by the user, in other words, an image period to be deleted is set as a single captured image period, specifically, an image period corresponding to the predetermined time period T from a recording start position. When this image period T is deleted, a new recording start position is set, and a new image period corresponding to an additional predetermined time period T from this new recording start position is set as a deletable time period.

In the first embodiment described above, in a case where the predetermined time period T is set, for example, to 1 second, in order to delete images in a time period of from 0 seconds to 3 seconds after a start of capture and to maintain images in a time period of from 3 seconds to 11 seconds in the memory 105, the following three shift processes have to be repeatedly executed.

Delete images in a time period of from 0 seconds to 1 second after the start of the capture by a first shift process.

Then, delete images in a time period of from 1 second to 2 seconds by a second shift process.

After that, delete images in a time period of from 2 seconds to 3 seconds by a third shift process.

In the second embodiment described below, such shift processes need not be repeatedly executed, and various image periods can be deleted only by a single shift process.

Specifically, in the second embodiment, as in the first embodiment described above, segments of a moving image that is stored in the memory 105 can be changed in response to operations by the user. In addition, images in the various capture time periods can be set as images-to-be-recorded by simpler operations by the user.

As in the first embodiment, images from a time point of a start of capture by a user are sequentially stored in the memory 105. When the user does not perform an operation in a predetermined time period T of, for example, 8 seconds, image frames in a time period of the 8 seconds after the start of the capture are stored in the memory, and then the image capture process is completed.

In response to an instruction (shift instruction) that is issued from the user to the imaging apparatus under a state in which images have not been stored up to an upper limit of capacity of the memory 105, part of image segments recorded in the memory 105 is deleted. In this way, additional captured images can be stored in the deleted region.

Figure 11:
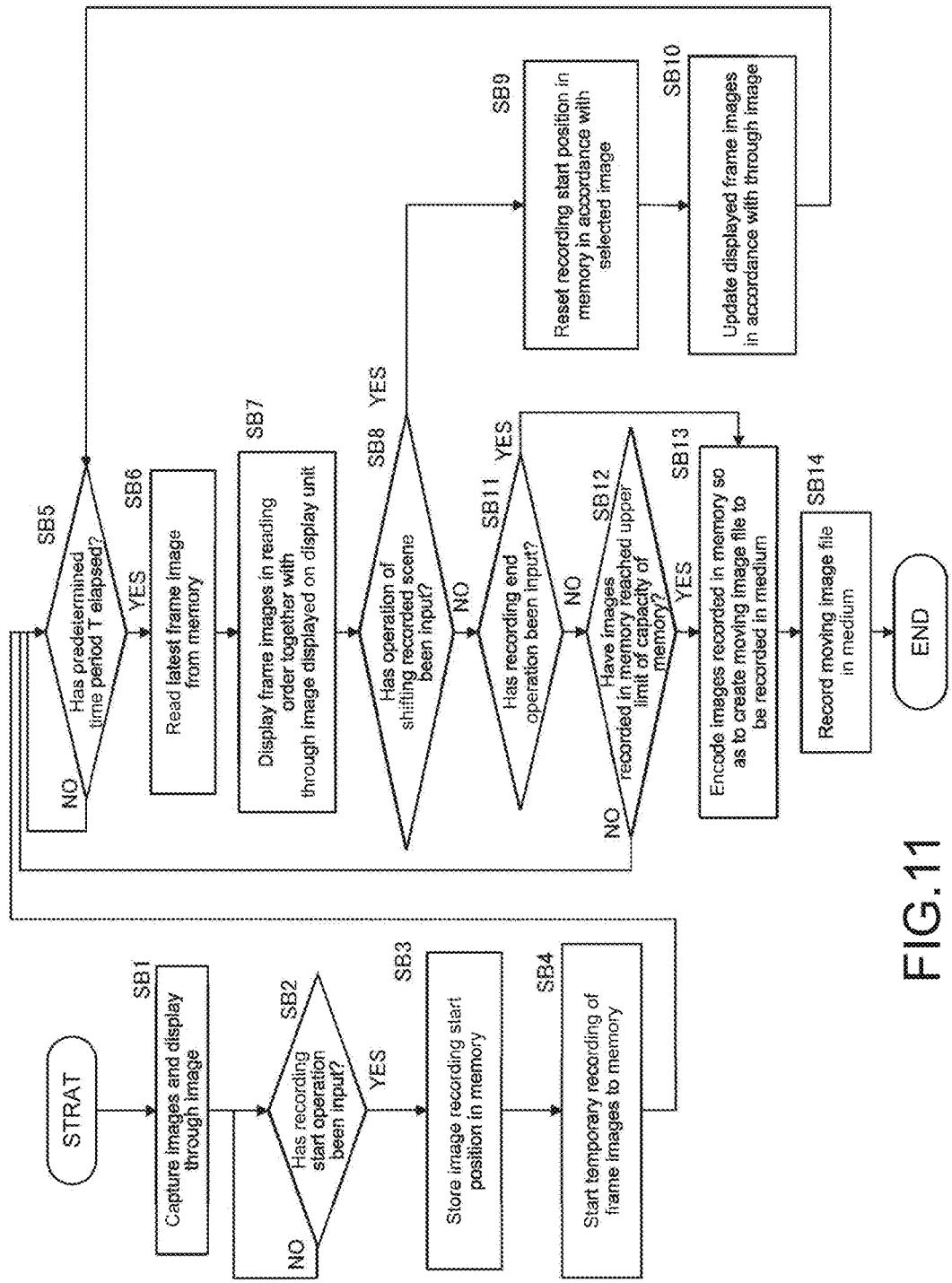
FIG. 11 is a flowchart showing a sequence of another image capture process and another image recording process that are executed by the imaging apparatus.

With reference to a flowchart shown in FIG. 11, a sequence of processes according to the second embodiment is described in detail. Note that, the processes in a flow shown in FIG. 11 are executed under control by the CPU of the control unit 103 of the imaging apparatus. The CPU controls the processes in accordance with programs that predetermine the sequence of the processes along with the flow.

Note that, the processes along with the flow shown in FIG. 11 include a capture process using a temporarily recording process in the memory 105, specifically, a process that is executed in a case where images are captured in accordance with a configuration mode selected by the user, such as the "snap moving image capture" described above and high-speed moving image capture.

(Step SB1)

First, in Step SB1, the images input through the lens of the imaging unit 101 are subjected to the image processes such as the demosaic process of setting pixel values of red, green, and blue with respect to pixels in the image processing unit 102. In the display processing unit 110, the images are subjected, for example, to the size conversion in accordance with an output size of the display processing unit 110, and then output to the display unit 111.

In other words, the display unit 111 displays the "through image" that is a currently input image.

(Step SB2)

Next, in Step SB2, the control unit 103 determines whether or not a recording start instruction has been input by the user. Specifically, the control unit 103 determines whether or not the recording start button (REC) has been pressed.

In a case where the recording start instruction has not yet been input by the user, the determination in Step SB2 is "No." As a result, the flow stays in Step SB2 until the input of the recording start instruction by the user.

Meanwhile, in a case where input of the recording start instruction by the user has been detected, the determination in Step SB2 is "Yes," and the flow proceeds to Step SB3.

(Step SB3)

In Step SB2, when the input of the recording start instruction by the user is detected, a moving image starts to be captured from that time point. Image frames of the moving image are subjected to the image processes in the image processing unit 102, and then sequentially input to the memory 105.

In Step SB3, an image recording start position (address) in the memory 105 is acquired, and is stored in an accessible memory in the control unit 103.

A process of displaying the through image at this time point on the display unit 111, and an image recording process in the memory 105 are the same as the processes described above with reference to FIGS. 4A and 4B in the first embodiment.

In other words, the through image that is displayed in Step SB1 in the flow of FIG. 11 is displayed as in FIG. 4A.

Further, as shown in FIG. 4B, the input images are sequentially recorded from the specific recording start position 200 in the memory 105. In Step SB3 in the flow of FIG. 11, a memory address of the recording start position 200 shown in FIG. 4B is acquired and stored in the memory in the control unit 103.

In the memory region 201 shown in FIG. 4B, image data items of image frames in a time period of from 0 seconds to 1 second after a start of recording are recorded. For example, when images are captured at a frame rate of 30 fps, that is, 30 images are captured per second, data items of the 30 images are recorded in the memory region 201. The image 211 shown in FIG. 4B is a representative one of the images stored in the memory region 201.

Further, in the memory region 202, image data items of image frames in a time period of from 1 second to 2 seconds after the start of the recording are recorded. When images are captured at the frame rate of 30 fps, data items of the 30 images are recorded also in the memory region 202. The image 212 shown in FIG. 4B is a representative one of the images stored in the memory region 202.

The same applies hereinafter. In the memory region 203, image data items of image frames in a time period of from 2 seconds to 3 seconds after the start of the recording are recorded. The image 213 shown in FIG. 4B is a representative one of the images stored in the memory region 203.

Subsequently, the image data items are recorded sequentially clockwise in the ring buffer. With this configuration, image data items in a time period of 8 seconds in total can be recorded up to the recording start position 200.

In a case where the shift process described above is not executed, the memory 105 records images in a time period of the 8 seconds from the start of the recording, and the recording process is completed.

Note that, when the user executes the shift process, a process of setting, for example, an image region of the memory region 201 as a region to be overwritten by additional captured images is executed. In other words, the memory region 201 is reset as a region to which images that are captured in a time period of from 8 seconds to 9 seconds after the start of the recording are written. By this shift process, images in a time period of from 1 second to 9 seconds after the start of the capture by the user are recorded in the memory 105.

The shift process in the first embodiment described above is set to enable images to be deleted in units of the predetermined time period T of, for example, 1 second by a single shift process. Meanwhile, in the second embodiment, images captured not only in the predetermined time period T of 1 second but also in a time period, for example, of 2 seconds or 3 seconds can be collectively deleted by a single shift process. Thus, images to be recorded in the memory 105 can be largely shifted.

Specifically, by the single shift process by the user, the memory region 201 and the memory region 202 in FIG. 4B can be collectively set as deletion objects so that new recording regions for subsequent captured images in a time period of 2 seconds are additionally set.

Referring back to the flow of FIG. 11, the sequence of the processes is further described.

(Step SB4)

In Step SB2, when the recording start instruction input by the user is detected, the moving image starts to be captured from that time point. Further, in Step SB3, the image recording start position (address) in the memory 105 is acquired, and is stored in the accessible memory in the control unit 103. This address is an address of the recording start position 200 in FIG. 4B.

In Step SB4, the captured images are stored in the memory 105 sequentially from the recording start position 200 in FIG. 4B.

(Step SB5)

Next, in Step SB5, the control unit 103 determines whether or not the predetermined time period [T] has elapsed from the capture start time point.

The predetermined time period [T] corresponds to a time interval in which captured images can be deleted by execution of the shift process. The user can collectively delete the captured images stored in the memory 105 in units of capture time periods nT. Note that, "n" is a natural number of 1, 2, 3, and subsequent numbers.

When the predetermined time period T is set to 1 second, the images stored in the memory 105 can be collectively deleted by the user in units of seconds, such as images captured in the time period of 1 second, images captured in the time period of 2 seconds, and images captured in the time period of 3 seconds. In accordance with the deleted memory regions, recording regions for subsequent captured images in a time period of nT second can be sequentially secured.

When the elapse of the predetermined time period [T] from the capture start time point is determined in Step SB5, the flow proceeds to Step SB6, or to returns to Step SB5 when the elapse of the predetermined time period [T] is not determined.

(Step SB6)

When the elapse of the predetermined time period T is detected in Step SB5, a latest captured image stored in the memory 105 is acquired in Step SB6.

(Step SB7)

In Step SB7, the latest captured image acquired in Step SB6 is displayed together with the through image displayed on the display unit 111.

A specific display example of the display unit 111 at a time point of Step SB7 is described with reference to FIGS. 12A, 12B, and 12C.

Figure 12A:
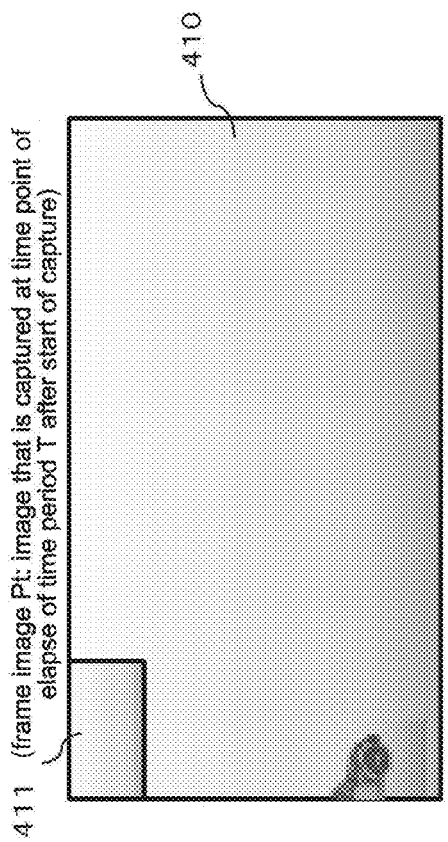
FIGS. 12A, 12B, and 12C are explanatory views of examples of data items displayed on the display unit.

FIG. 12A shows a display example of the display unit 111 after the elapse of the predetermined time period T from the start of the capture.

The display unit 111 displays a through image 410 that is a current image being currently acquired through the lens, and in Step SB6, displays the latest image acquired from the memory 105, that is, a frame image 411(Pt) that is captured at a time point of the elapse of the predetermined time period T after the start of the capture.

The display unit 111 sequentially displays latest captured images acquired from the memory 105 every time subsequent predetermined time periods T elapse. In other words, after the elapse of the predetermined time period T from the start of the capture, only the frame image 411(Pt) that is captured at the time point of the elapse of the predetermined time period T after the start of the capture is displayed as shown in FIG. 12A.

Figure 12B:
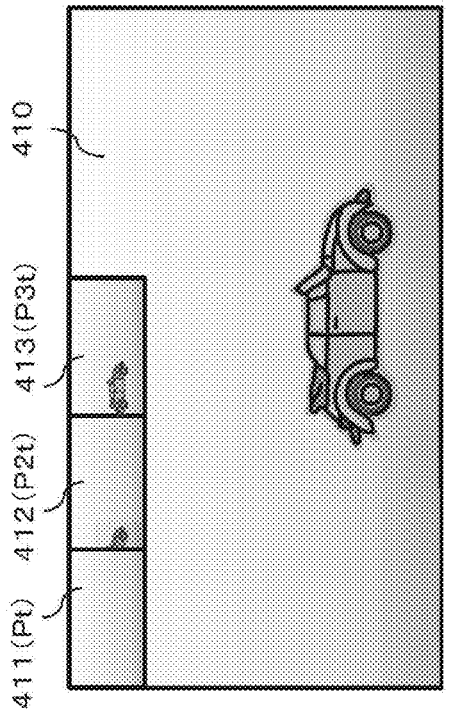

Further, after elapse of a time period 2T from the start of the capture, a latest captured image that is acquired at that time point from the memory 105 is displayed as shown in FIG. 12B.

The display unit 111 displays not only the through image 410 that is a current image being currently acquired through the lens but also the following two frame images.

Frame image 411(Pt) that is captured at the time point of the elapse of the time period T after the start of the capture.

Frame image 412(P2t) that is captured at the time point of the elapse of the time period 2T after the start of the capture.

Figure 12C:
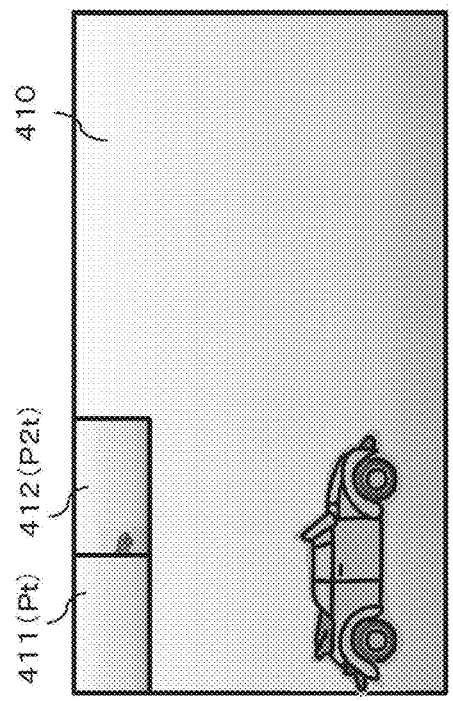

Still further, after elapse of a time period 3T from the start of the capture, a latest captured image that is acquired at that time point from the memory 105 is displayed as shown in FIG. 12C.

The display unit 111 displays not only the through image 410 that is a current image being currently acquired through the lens but also the following three frame images.

Frame image 411(Pt) that is captured at the time point of the elapse of the time period T after the start of the capture.

Frame image 412(P2t) that is captured at the time point of the elapse of the time period 2T after the start of the capture.

Frame image 413(P3t) that is captured at the time point of the elapse of the time period 3T after the start of the capture.

Subsequently, every time the time periods T elapse, additional latest captured images are sequentially acquired from the memory 105, and additionally displayed on the display unit 111.

Note that, this process corresponds to the sequence of the following processes of Step SB5, Step SB6, Step, SB7, Step SB8, Step SB11, Step SB12, and Step SB5 in the flow shown in FIG. 11.

As described above, a process of acquiring a latest captured image from the memory 105 and displaying the latest captured image additionally on the display unit is executed in every loop process of from Step SB5 to Step SB12, in other words, every time the predetermined time periods T elapse.

Note that, the above-mentioned loop process is continuously executed in a case where the shift instruction from the user has not yet been detected in Step SB8, a recording end instruction has not yet been detected in Step SB11, and recorded images in the memory 105 have not yet reached the upper limit of the memory capacity.

When the shift instruction from the user is detected in Step SB8, the flow proceeds to Step SB9.

Further, when the recording end instruction is detected in Step SB11, or when the recorded images in the memory 105 are determined to have reached the upper limit of the memory capacity in Step SB12, the flow proceeds to Step SB13.

Those processes are described in detail below.

(Step SB8)

Next, in Step SB8, the control unit determines whether or not the input of the shift instruction from the user with respect to the recorded images has been detected.

An example of the shift instruction by the user is described with reference to FIG. 13.

Figure 13:
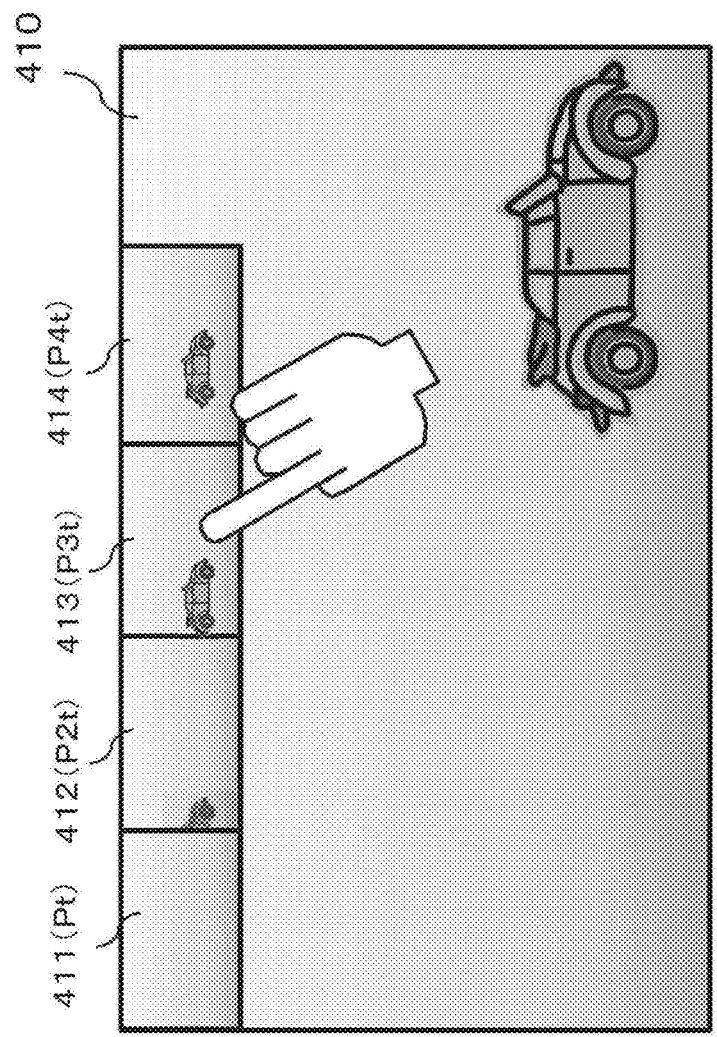
FIG. 13 is an explanatory view of a shift process by a user.

FIG. 13 shows the example of the shift instruction by the user. The display unit 111 is formed of a touch panel configured to detect contact of a finger of the user. In other words, the display unit 111 also has the function of the user interface unit 104.

As shown in FIG. 13, in order to issue the shift instruction, the user selects and touches an image as a recording start image in the memory 105. In response to the shift instruction, the shift process of shifting a recording start position in the memory correspondingly to the image selected by the user is executed. This process enables captured images preceding the image selected by the user to be deleted from the images that have been stored in the memory 105.

In the example shown in FIG. 13, an image frame 413(P3t) is selected as a shift specifier image by the user at a time point of elapse of a time period 4T, that is, at least 4 seconds after the start of the capture.

The image frame 413(P3t) is an image that is captured at the time point of the elapse of 3T, that is, 3 seconds after the start of the capture.

By this process, a position of an image corresponding to the image frame 413(P3t) in the memory 105 is set as the recording start position, and all the memory stored images from the start of the capture to a time point immediately preceding the time point 3T are set as deletion object images.

This update process on the data stored in the memory is executed as a process of Step SB9 described below.

When the shift instruction by the user is detected in Step SB8, the flow proceeds to Step SB9, or to Step SB11 when not detected.

(Step SB9)

In Step SB9, the process of shifting the recording start position in the memory is executed. This process enables the captured images preceding the image specified by the user to be deleted from the images that have been stored in the memory 105.

A specific processing example of the memory update process is described with reference to FIGS. 14A and 14B. FIGS. 14A and 14B show the following.

An Example of the process in the shift instruction by the user (Left part) State in which the memory (ring buffer) 105 has not yet been updated (before the shift instruction)

(Right part) State in which the memory (ring buffer) 105 has been updated (after the shift instruction)

Note that, in the example shown in FIGS. 14A and 14B, the shift instruction is issued after elapse of approximately 4 seconds from the start of the image recording in the memory 105.

As shown in FIG. 14A, the following four frame images 411 to 414 that are acquired from the memory 105 are displayed together with the through image 410 on the display unit 111. Note that, in this example, the predetermined time period T is set to 1 second.

(1) Frame image 411(Pt) corresponding to an image after the elapse of the predetermined time period T of 1 second from the start of the recording (start of the capture process)

(2) Frame image 412(P2t) corresponding to an image after the elapse of 2T, that is, 2 seconds from the start of the recording (start of the capture process)

(3) Frame image 413(P3t) corresponding to an image after the elapse of 3T, that is, 3 seconds from the start of the recording (start of the capture process)

(4) Frame image 414(P4t) corresponding to an image after the elapse of 4T, that is, 4 seconds from the start of the recording (start of the capture process)

A recording state in the memory 105 at this time point is shown in FIG. 14B left part before the memory update.

A recording start position 420 is an initial set position, which is set as a time point of the start of the capture.

A memory region 421 stores images captured from the start of the capture to the time point of the elapse of 1 second. A memory region 422 stores images captured in a time period of from 1 second to 2 seconds. A memory region 423 stores images captured in a time period of from 2 seconds to 3 seconds. A memory region 424 stores images captured in a time period of from 3 seconds to 4 seconds. A memory region 425 stores images captured from 4 seconds to a current time point.

Part of the memory region 425, and memory regions 426 to 428 are used as storage regions for images to be subsequently captured.

In such a state, as shown in FIG. 14A, the user issues the shift instruction of specifying the frame image 413(P3t).

This shift instruction is interpreted as an instruction of setting the image corresponding to the frame image 413(P3t) as a recording start position.

Under the control by the control unit 103 and the memory control unit 106, the recording start position 420 in the memory 105, which is shown in FIG. 14B right part, is shifted to a position corresponding to a time point of 3 seconds after the start of the capture, which is a recording start position 430 shown in FIG. 14B right part. This position corresponds to a recording position of the frame image 413(P3t) specified the user.

The state shown in FIG. 14B right part after the memory update corresponds to a state of the memory after the shift process. The memory 105 is updated by executing the following processes (1) and (2).

(1) Shifting the recording start position to a recording position of an image specified by the shift instruction, that is, the position corresponding to the time point of 3 seconds after the start of the capture.

(2) Setting recording regions for images preceding the image specified by the shift instruction as deletable regions, that is, as writable regions for subsequent captured images.

In the process (2), as shown in FIG. 14B right part, the recording regions for the images preceding the image specified by the shift instruction, specifically, the memory regions 421 to 423 indicated as dotted regions in FIG. 14B right part are collectively set as the deletable regions, that is, as writable regions for subsequent captured images.

This memory update process enables, as shown in FIG. 14B right part, in the memory 105 after the update, the memory regions 421 to 423 to be set as additional image writable regions in addition to regions from a latter part of the memory region 425 to a memory region 428. With this, images in a time period of from 3 seconds to 11 seconds after an initial start of image recording (start of capture) can be written in the memory 105.

Note that, although the images in the time period of from 0 seconds to 3 seconds after the start of the capture are deleted through this process, finally, images in a time period of 8 seconds from 3 seconds to 11 seconds after the start of the capture can be maintained as recorded data items in the memory 105.

In other words, by the shift process shown in FIGS. 14A and 14B, memory stored images preceding the shift process, that is, images in a time period of from 0 seconds to 8 seconds after the capture start time point can be changed into memory stored images after the shift process, that is, images in the time period of from 3 seconds to 11 seconds after the capture start time point.

By the process of Step SB9 in the flowchart shown in FIG. 11, the state shown in FIG. 14B left part before the memory update is shifted to the state shown in FIG. 14B right part after the memory update.

Note that, as shown in FIGS. 14A and 14B, the memory 105 stores image data items in time series sequentially clockwise from the recording start position in the memory.

In this way, images can be recorded up to the recording start position.

By the shift process, the recording start position in the memory is shifted to a recording position of a subsequent captured image. In other words, recording regions for images that are captured preceding the recording start position are set as deletable regions.

In this way, new recording regions for subsequent captured images can be set.

Note that, the shift process can be repeatedly executed at any timing as many times as necessary in a time period until the captured images are recorded up to the upper limit of the memory capacity.

(Step SB10)

The flow of FIG. 11 is described again. In Step SB9, the memory update described with reference to FIGS. 14A and 14B, that is, the memory update as shown in FIG. 14B is executed. Then, in Step SB10, the update process on the images displayed on the display unit 111 is executed. Specifically, frame images, which are displayed to show the memory recorded images while being superimposed on the "through image" that is a current image, are updated.

Note that, after completion of the process of Step SB10, the flow returns to Step SB5.

Figure 15:
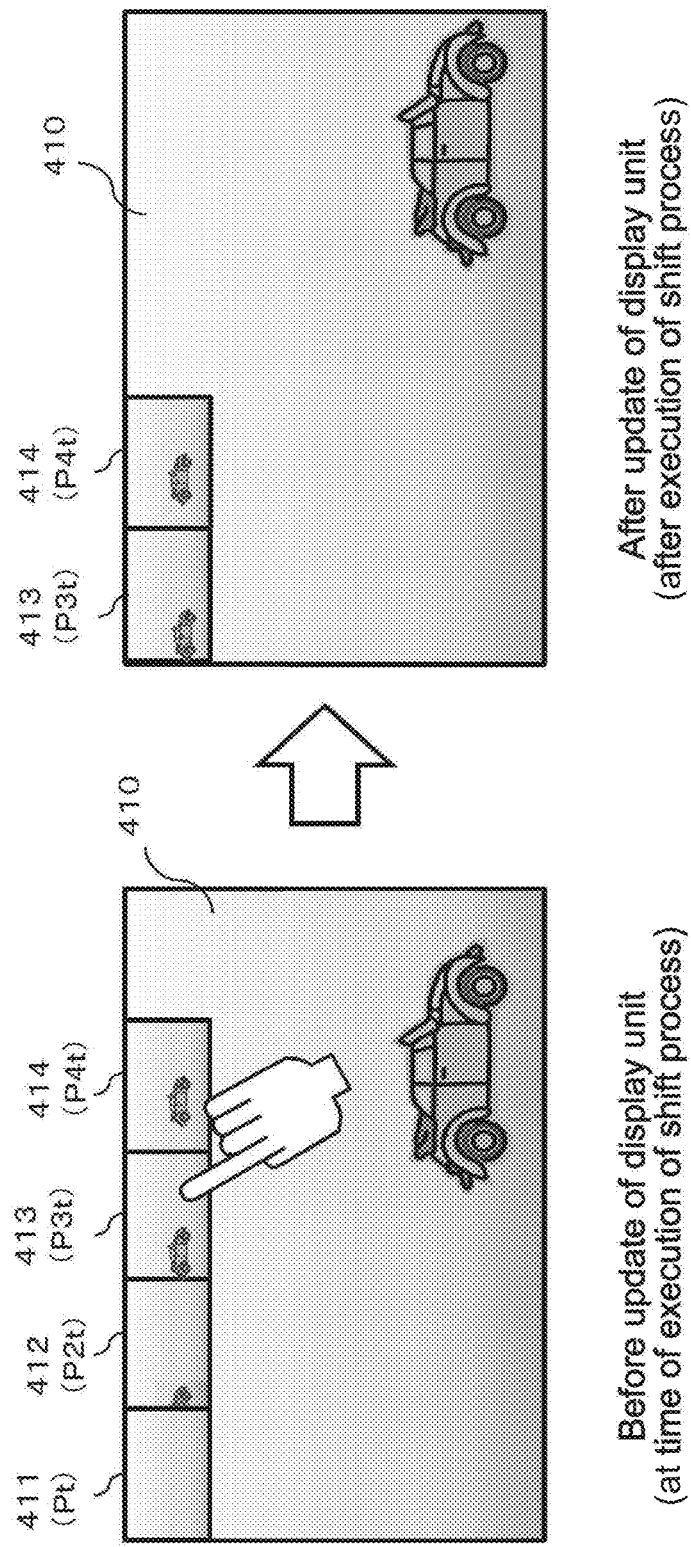
FIG. 15 is an explanatory view of a display data update process in the display unit in the case of executing the shift process.

An example of the update process on the frame images displayed on the display unit 111 is described with reference to FIG. 15. FIG. 15 show the following.

(C1) Images displayed on the display unit 111 before the update (at the time of execution of the shift process)

(C2) Images displayed on the display unit 111 after the update (after the execution of the shift process)

The images displayed on the display unit 111 before the update (at the time of execution of the shift process) in FIG. 15 left part are the same as the displayed images shown in FIGS. 13, 14A, and 14B.

The following four frame images 411 to 414 that are acquired from the memory 105 are displayed together with the through image 410 on the display unit 111. Note that, in this example, the predetermined time period T is set to 1 second.

(1) Frame image 411(Pt) corresponding to an image after the elapse of the predetermined time period T of 1 second from the start of the recording (start of the capture process)

(2) Frame image 412(P2t) corresponding to an image after the elapse of 2T, that is, 2 seconds from the start of the recording (start of the capture process)

(3) Frame image 413(P3t) corresponding to an image after the elapse of 3T, that is, 3 seconds from the start of the recording (start of the capture process)

(4) Frame image 414(P4t) corresponding to an image after the elapse of 4T, that is, 4 seconds from the start of the recording (start of the capture process)

In this state, the user executes the shift process of specifying the frame image 413(P3t) corresponding to the image after the elapse of 3T, that is, 3 seconds from the start of the recording.

By this shift process, captured images preceding the frame image 413(P3t), specifically, the images in the time period of from 0 seconds to 3 seconds after the start of the capture are set as deletable images. In other words, as described above with reference to FIGS. 14A and 14B, the images stored in the memory regions 421 to 423 are set as deletion objects by the update process in the memory 105.

In response to the update of the memory 105, the display on the display unit 111 is also updated. In other words, a display changing process of FIG. 15 is executed.

As shown in FIG. 15 right part, the frame image 413(P3t), which is set as a new recording start position, and subsequent frame images at time intervals T, specifically, the frame image 413(P3t) and the frame image 414(P4t) are displayed together with the through image 410 on the display unit 111. The frame image 411(Pt) and the frame image 412(P2t) that precede to the frame image 413(P3t) are deleted.

In this way, the images that are displayed on the display unit are updated to display an image corresponding to a latest recording start position, which is set by the shift process, and a subsequent image at the predetermined interval T.

This process is a display image update process of SB10 in the flow shown in FIG. 11.

(Step SB11)

Referring back to FIG. 11, the sequence of the processes is further described.

When the input of the shift instruction by the user is detected in Step SB8, as described above, Steps SB9 and SB10 are executed so as to execute the update processes in the memory 105 and the display unit 111.

Meanwhile, when the input of the shift instruction by the user is not detected in Step SB8, the flow proceeds to Step SB11.

In Step SB11, whether or not the recording end instruction has been input by the user is determined. The recording end instruction can be input in various ways. For example, the re-pressing of the recording operation button (REC) during the execution of the recording process is determined as the recording end instruction.

When the input of the recording end instruction by the user is detected in Step SB11, the flow proceeds to Step SB13, or proceeds to Step SB12 when not detected.

(Step SB12)

When the input of the recording end instruction by the user is not detected in Step SB11, the flow proceeds to Step SB12, and whether or not the recorded images in the memory 105 have reached the upper limit of the storage capacity of the memory 105 is determined.

When the upper limit of the storage capacity is determined to have been reached, the flow proceeds to Step SB13. In a case where the upper limit of the storage capacity has not yet been reached, the flow returns to Step SB5.

(Step SB13)

In Step SB12, when the recorded images in the memory 105 are determined to have reached the upper limit of the storage capacity of the memory 105, the flow proceeds to Step SB13.

In Step SB13, the encoding process with the codec 107 is executed on the images stored in the memory 105. With this, a moving image data file to be stored in the storage 108 as a final recording medium for image data is created.

Note that, also when the recording end instruction from the user is detected in Step SB11 described above, the same process is executed in Step SB13.

(Step SB14)

In Step SB14, the moving image file to be recorded in a medium, which is created in Step SB13, is stored in the storage 108. Note that, examples of the storage 108 include recording media such as an SD card.

In this embodiment, after a start of capture, frame images captured every time the predetermined time periods T elapse are displayed adjacent to each other on the display unit 111 so that any of the displayed images can be selected. Captured images preceding the selected image are set as images to be deleted from the memory 105.

This process enables, by a single shift operation, images captured in various time periods, specifically, not only in the predetermined time period T but also, for example, in 2T, 3T, 4T, and subsequent time periods, to be collectively deleted, and subsequent captured images to be recorded in the memory.

[6. Modification of Second Embodiment]

Next, a modification of the images displayed on the display unit 111 in the second embodiment described above is described with reference to FIG. 16.

In the second embodiment described above, as described with reference, for example, to FIGS. 12A, 12B, 12C, and FIG. 13, of the images recorded in the memory 105, images captured at predetermined time intervals, specifically, the image captured after the elapse of the time period T, the image captured after the elapse of the time period 2T, and the subsequent images captured after the elapse of the time periods 3T, 4T, and subsequent time periods after a start of capture are set as image frames to be displayed together with the through image 410 on the display unit 111.

The user can execute the shift process of selecting any of those displayed images, and deleting images preceding the selected image from the memory 105.

However, when the image frames are displayed in this way, the display unit 111 displays only the through image without displaying image to be selected as a shift specifier image at all until the elapse of, for example, the predetermined time period T from a start of capture.

An image display example according to this modification is described with reference to FIG. 16.

Figure 16:
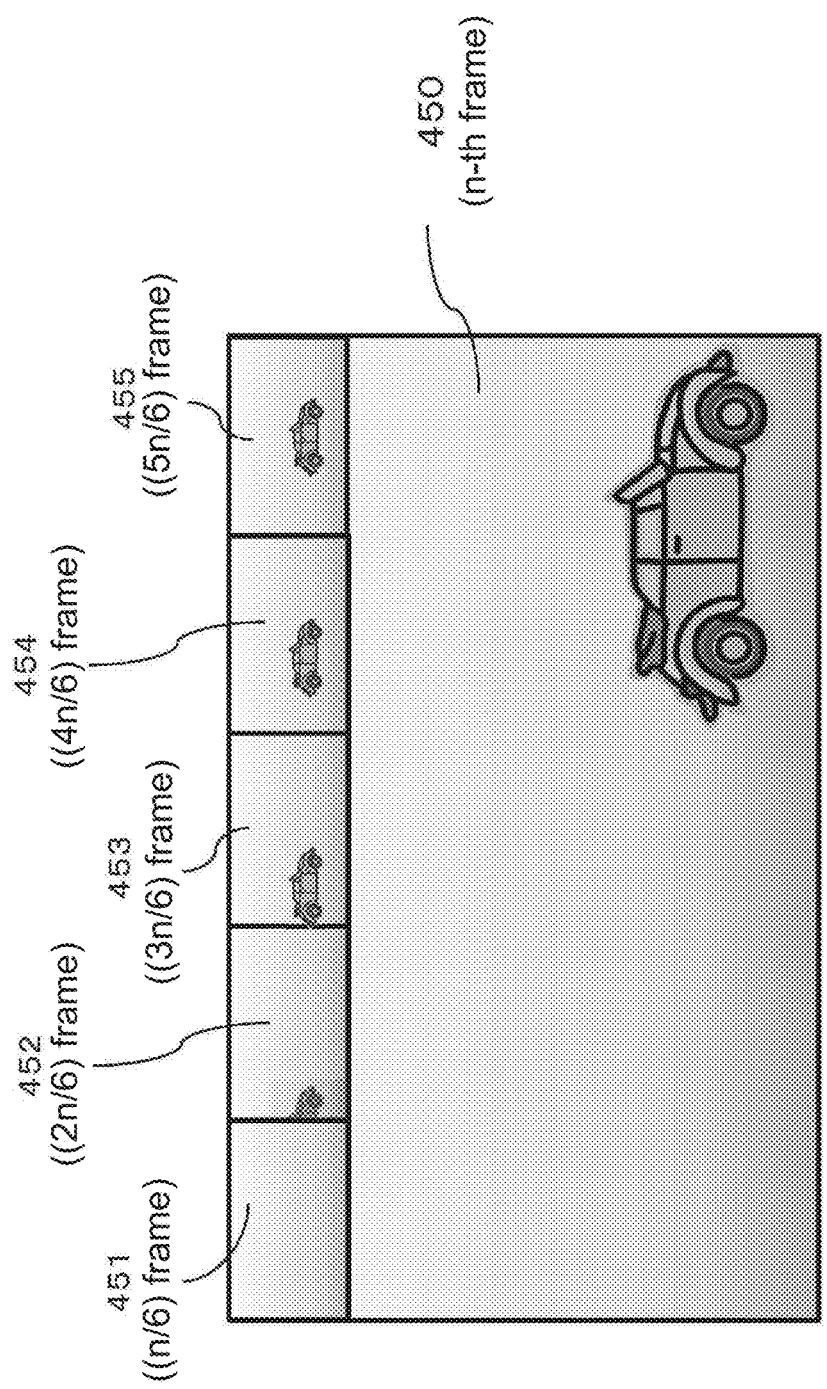
FIG. 16 is an explanatory view of an example of data items displayed on the display unit.

FIG. 16 shows the image display example of the display unit 111 in this modification.

The display unit 111 displays not only a through image 450 corresponding to a currently captured image but also the following frame images. Note that, the through image 450 is an image corresponding to an n-th frame with respect to a recording start position in the memory 105.

Images to be displayed together with the through image 450 corresponding to the n-th frame are set as follows:

(1) Frame image 451 corresponding to (n/6) frame (2) Frame image 452 corresponding to (2n/6) frame (3) Frame image 453 corresponding to (3n/6) frame (4) Frame image 454 corresponding to (4n/6) frame (5) Frame image 455 corresponding to (5n/6) frame In this way, images from the recording start position in the memory to the through image 450 are equally divided in a time direction, and frame images at respective boundaries are displayed.

Note that, the number of the displayed images including the through image in the example shown in FIG. 16 is six, and hence each of the images is displayed in a divided time period of ⅙. However, the number of images to be displayed can be changed. Also in this case, the capture time period is divided in accordance with the number of the images to be displayed, and images at respective boundaries are displayed.

This setting enables a plurality of images to be displayed immediately after the start of the capture, and the user to select a shift specifier image from a plurality of captured images preceding the currently captured image.

[7. Image Capture Process and Image Recording Process According to Third Embodiment]

Next, an image capture process and an image recording process that are executed by the imaging apparatus according to a third embodiment of the present disclosure are described.

In the third embodiment described below, a shift specifier image can be selected from a plurality of images as in the second embodiment described above.

Figure 17:
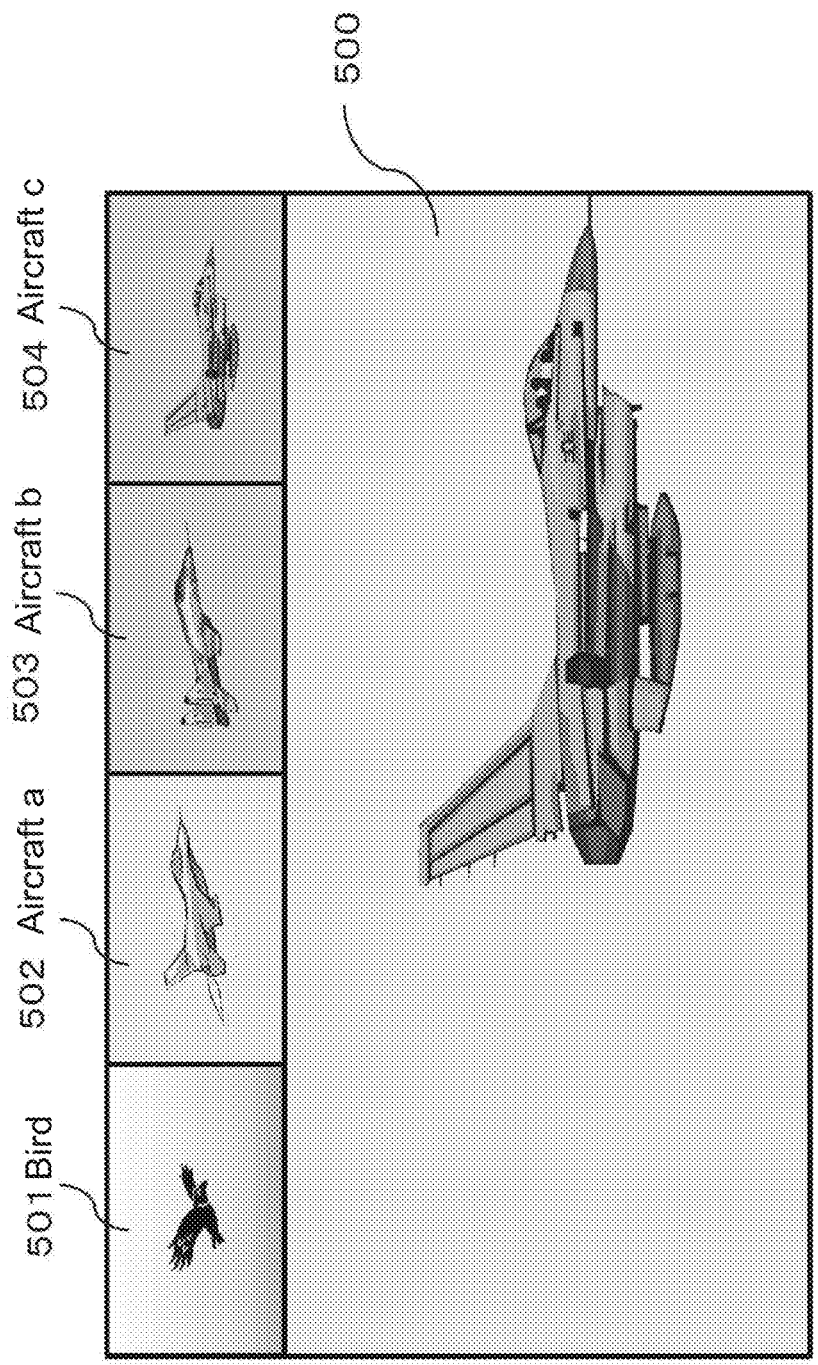
FIG. 17 is another explanatory view of an example of data items displayed on the display unit.

FIG. 17 shows a display example of the display unit 111 in the third embodiment.

As shown in FIG. 17, the display unit 111 displays not only a through image 500 that is a currently captured image but also the following four frame images, each of which can be selected as a shift specifier image by the user at the time of the shift process.

Image 501 of a bird

Image 502 of an aircraft a

Image 503 of an aircraft b

Image 504 of an aircraft c

By selecting any of those four frame images, the user can set the selected image to the recording start position in the memory 105. As a result, recording regions for captured images preceding the recording start position are set as overwritable regions, and the selected image and subsequent successively captured images up to the capacity of the memory can be set as finally recorded images.

The four frame images 501 to 504 shown in FIG. 17 each have a peak of a motion amount obtained by analysis of the captured images.

The motion amount detection unit 113 in the imaging apparatus, which is shown in FIG. 1, calculates a motion amount by using a plurality of successively captured images.

Specifically, the motion amount detection unit 113 calculates a motion amount from frame images by calculating, for example, differences between pixel values at corresponding pixel positions in the plurality of successively captured images.

For example, when images each containing only a completely motionless static object are captured, pixel values at corresponding pixel positions in a plurality of temporally successive frame images are substantially equal to each other. As a result, differences between the pixel values are scarcely generated.

However, as in the images 501 to 504 shown in FIG. 17, when a moving object (photographic subject) such as the bird and the aircraft is contained in each of the captured images, differences between the pixel values at the corresponding pixel positions in the plurality of successively captured frame images are generated.

The motion amount detection unit 113 acquires, for example, two successively captured images, and calculates a total sum of differences between pixel values of pixels. Based on a result of the calculation, a motion amount of the images is calculated. For example, when a total sum value of differences between an image and a preceding captured image is large, the image is determined to contain a dynamic object (photographic subject).

At the time of capturing a moving image, a target photographic subject is moving in many cases. Meanwhile, in order to capture and record an instant motion, capturing needs to be performed at an appropriate timing, which is difficult for ordinary users who are unfamiliar with capturing.

In particular, as in the imaging apparatus shown in FIG. 1, when the capacity of the memory 105 for temporarily recording captured images is limited, a recordable time period is limited. Thus, it is more difficult to set an optimum timing and perform capturing.

According to this embodiment, a moving photographic subject as a target to be captured can be easily captured and recorded.

Correspondence between captured images, a motion amount detected by the motion amount detection unit 113, and the frame images displayed on the display unit 111 in this embodiment is described with reference to FIG. 18.

Figure 18:
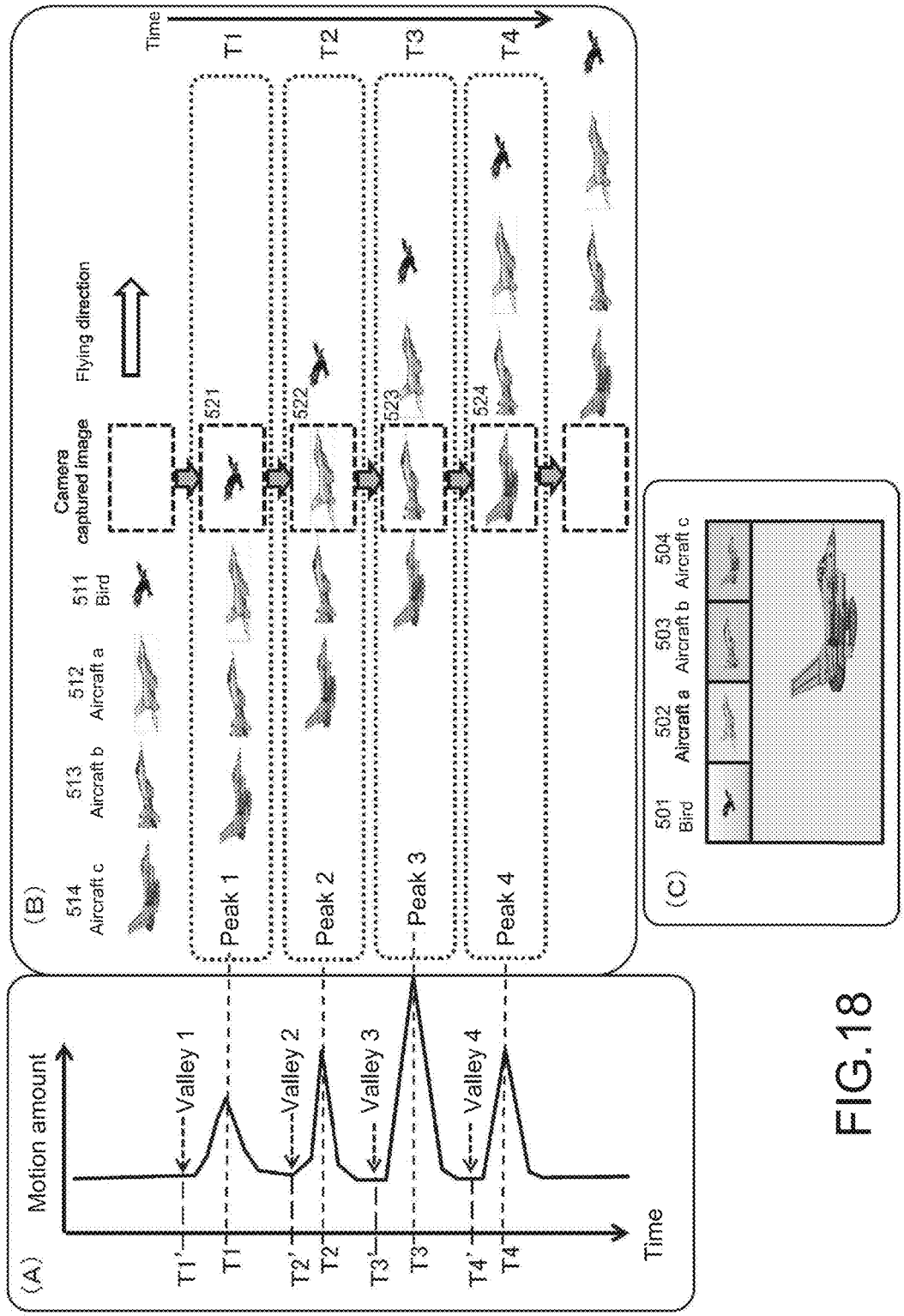
FIG. 18 is an explanatory view of a shift process that uses a motion amount detection process.

FIG. 18 shows the following:

A Time transition data of the motion amount detected by the motion amount detection unit 113.

B Positions along with the time transition of photographic subjects, and camera captured images.

C Frame images displayed on the display unit 111

(B) of FIG. 18 shows how the photographic subjects move along with transition of scenes captured by a camera, and the time transition of the camera captured images.

The time elapses in the order of T1, T2, T3, and T4, during which a bird 511, an aircraft a 512, an aircraft b 513, and an aircraft c 514 are sequentially flying from the left to the right.

The camera is fixed to capture the moving image in a fixed direction.

At the time point T1, the bird 511 is captured as a photographic subject in a camera captured image 521.

At the time point T2, the aircraft a 512 is captured as a photographic subject in a camera captured image 522.

At the time point T3, the aircraft b 513 is captured as a photographic subject in a camera captured image 523.

At the time point T4, the aircraft c 514 is captured as a photographic subject in a camera captured image 524.

(A) of FIG. 18 shows the time transition data of the motion amount detected by the motion amount detection unit 113. As in (B) of FIG. 18, the ordinate axis represents time base indicating the time transition from top to bottom, and the abscissa axis represents the motion amount. The motion amount represented by the abscissa axis becomes larger toward the right side.

In this example, the camera sequentially captures the bird 511, the aircraft a 512, the aircraft b 513, and the aircraft c 514 along with the elapse of the time.

When such capturing is performed, in the time transition data of the motion amount detected by the motion amount detection unit 113, as shown in (A) of FIG. 18, the peaks of the motion amount are indicated at timings when the moving photographic subjects respectively come substantially to centers of the captured images.

Specifically, as shown in (B) of FIG. 18, the peak values of the motion amount are obtained respectively at the following timings T1, T2, T3, and T4.

(1) Capturing timing T1 of the camera captured image 521 in which the bird 511 has come to the center thereof (2) Capturing timing T2 of the camera captured image 522 in which the aircraft a 512 has come to the center thereof (3) Capturing timing T3 of the camera captured image 523 in which the aircraft b 513 has come to the center thereof (4) Capturing timing T4 of the camera captured image 524 in which the aircraft c 514 has come to the center thereof.

As a result, the time transition of the motion amount measured by the motion amount detection unit 113 is obtained as the data as shown in (A) of FIG. 18.

The control unit 103 selects frame images to be displayed on the display unit 111 based on information detected by the motion amount detection unit 113.

Specifically, the captured images corresponding to positions at which the peaks of the motion amount are measured by the motion amount detection unit 113 are sequentially selected and displayed on the display unit 111. In other words, the sequentially selected captured images are displayed as images that can be specified by the user at the time of the shift process.

As a result, as shown in (C) of FIG. 18, the frame image 501 of the bird, the frame image 502 of the aircraft a, the frame image 503 of the aircraft b, and the frame image 504 of the aircraft c are selected and displayed. Note that, the displayed images shown in (C) of FIG. 18 are the same as the displayed images shown in FIG. 17.

In this way, in this embodiment, the images corresponding to the peaks of the motion amount of the captured images are set as the images that can be specified by the user at the time of the shift process.

As an example of the shift process, an example of the update process in the memory 105 in a case where the user executes a shift process of specifying the frame image 503 in which the aircraft b is contained substantially at a central position thereof is described with reference to FIGS. 19A and 19B.

Figure 19A:
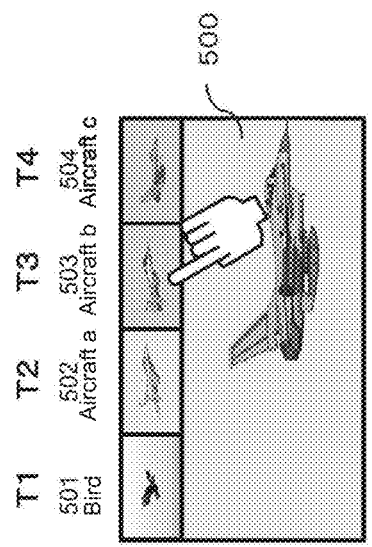
FIGS. 19A and 19B are explanatory views of a memory update process in a case of executing the shift process that uses the motion amount detection process.
Figure 19B:
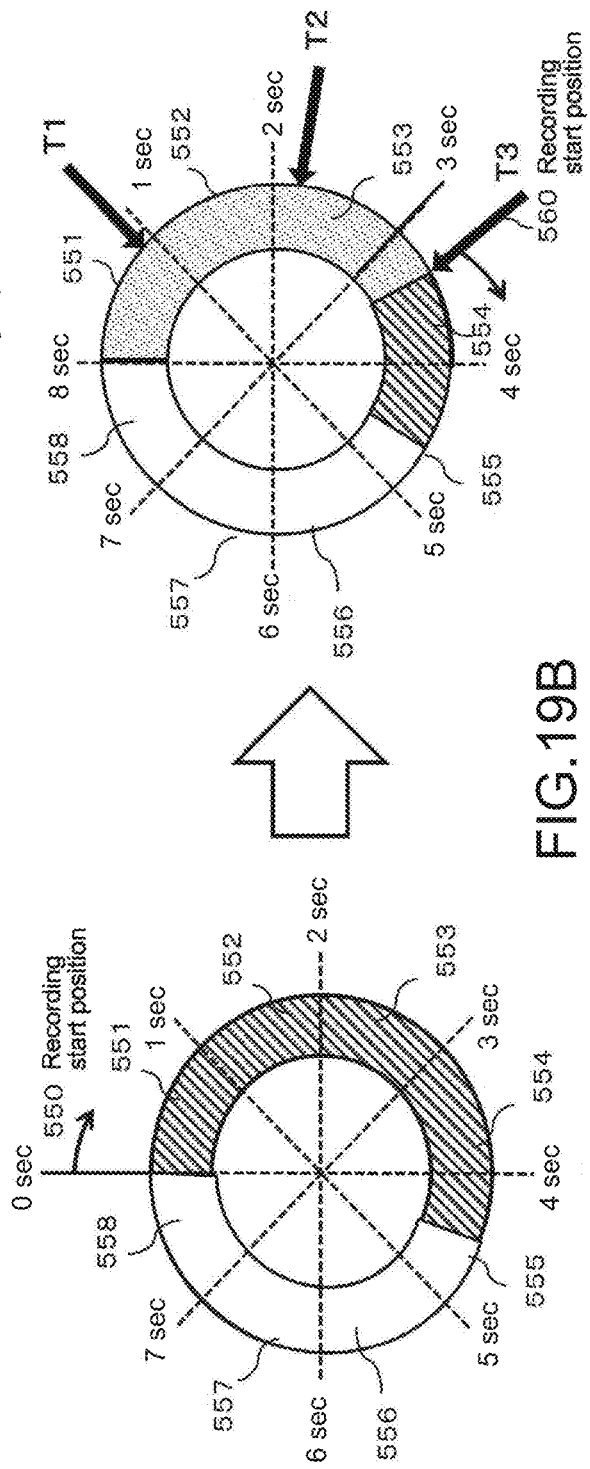

FIGS. 19A and 19B show the following:

An Example of the process in the shift instruction by the user (Left part) State in which the memory (ring buffer) 105 has not yet been updated (before the shift instruction)

(Right part) State in which the memory (ring buffer) 105 has been updated (after the shift instruction)

Note that, in the example shown in FIGS. 19A and 19B, the shift instruction is issued after elapse of approximately 4 seconds from the start of the image recording in the memory 105.

As shown in FIG. 19A, the following four frame images 501 to 504 that are acquired from the memory 105 are displayed together with the through image 500 on the display unit 111.

(1) Frame image 501 of the bird, which is an image captured at a time point when a first peak of the motion amount is detected after the start of the recording (start of the capture process)

(2) Frame image 502 of the aircraft a, which is an image captured at a time point when a second peak of the motion amount is detected after the start of the recording (start of the capture process)

(3) Frame image 503 of the aircraft b, which is an image captured at a time point when a third peak of the motion amount is detected after the start of the recording (start of the capture process)

(4) Frame image 504 of the aircraft c, which is an image captured at a time point when a fourth peak of the motion amount is detected after the start of the recording (start of the capture process)

A recording state in the memory 105 at this time point is shown in FIG. 19B left part before the memory update.

A recording start position 550 is an initial set position, which is set as a time point of the start of the capture.

Captured images are stored from a memory region 551 to a half of a memory region 555.

Part of the memory region 555, and memory regions 556 to 558 are used as storage regions for images to be subsequently captured.

In such a state, as shown in FIG. 19A, the user issues the shift instruction of specifying the image 503 of the aircraft b.

This shift instruction is interpreted as an instruction of setting the image 503 of the aircraft b as a recording start position.

Under the control by the control unit 103 and the memory control unit 106, the recording start position 550 in the memory 105, which is shown in FIG. 19B left part, is shifted to a recording start position 560 shown in FIG. 19B right part.

The recording start position 560 shown in FIG. 19B corresponds to a recording position of the image 503 of the aircraft b, that is, corresponds to the position of the peak of the motion amount at the timing T3, which is described with reference to FIG. 18.

The state shown in FIG. 19B right part after the memory update corresponds to a state of the memory after the shift process. The memory 105 is updated by executing the following processes (1) and (2).

(1) Shifting the recording start position to a recording position of an image specified by the shift instruction, that is, a recording position of the image 503 of the aircraft b at the timing T3 at which the peak of the motion amount is detected.

(2) Setting recording regions for images preceding the image specified by the shift instruction as deletable regions, that is, as writable regions for subsequent captured images.

In the process (2), as shown in FIG. 19B right part, the recording regions for the images preceding the image specified by the shift instruction, specifically, regions from the memory region 551 to a point corresponding to the timing T3 in the memory region 554, which are indicated as dotted regions in FIG. 19B right part, are set as the deletable regions, that is, as writable regions for subsequent captured images.

This memory update process enables, as shown in FIG. 19B right part, in the memory 105 after the update, regions from the memory regions 551 to a former part of the memory region 554 to be set as additional image writable regions in addition to regions from a latter part of the memory region 555 to the memory region 558. This shift process enables the user to reliably set images of the aircraft b as images to be recorded.

Note that, when the memory update process shown in FIGS. 19A and 19B is executed, the image 503 of the aircraft b, which is displayed on the display unit 111, and subsequent captured images are maintained in the memory 105.

In other words, the captured image in which the aircraft b is positioned substantially at a center thereof and subsequent images can be maintained as recorded images, and images preceding the captured image in which the aircraft b is positioned substantially at the center thereof are excluded from the recorded images.

For example, an image in which a leading end portion of the aircraft b is contained on the left side thereof is deleted.

Another memory update process of maintaining such an image as a recorded image is described with reference to FIG. 20.

As well as FIGS. 19A, 19B, 20A, and 20B show the following.

An Example of the process in the shift instruction by the user (Left part) State in which the memory (ring buffer) 105 has not yet been updated (before the shift instruction)

(Right part) State in which the memory (ring buffer) 105 has been updated (after the shift instruction)

Figure 20A:
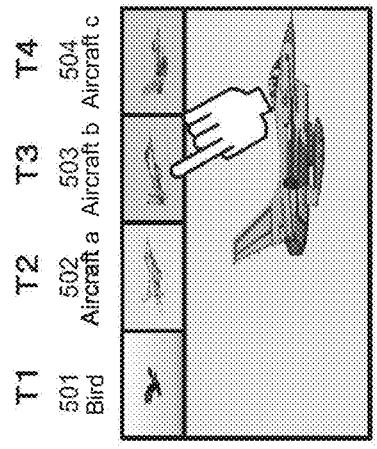
FIGS. 20A and 20B are explanatory views of a modification of the memory update process in the case of executing the shift process that uses the motion amount detection process.
Figure 20B:
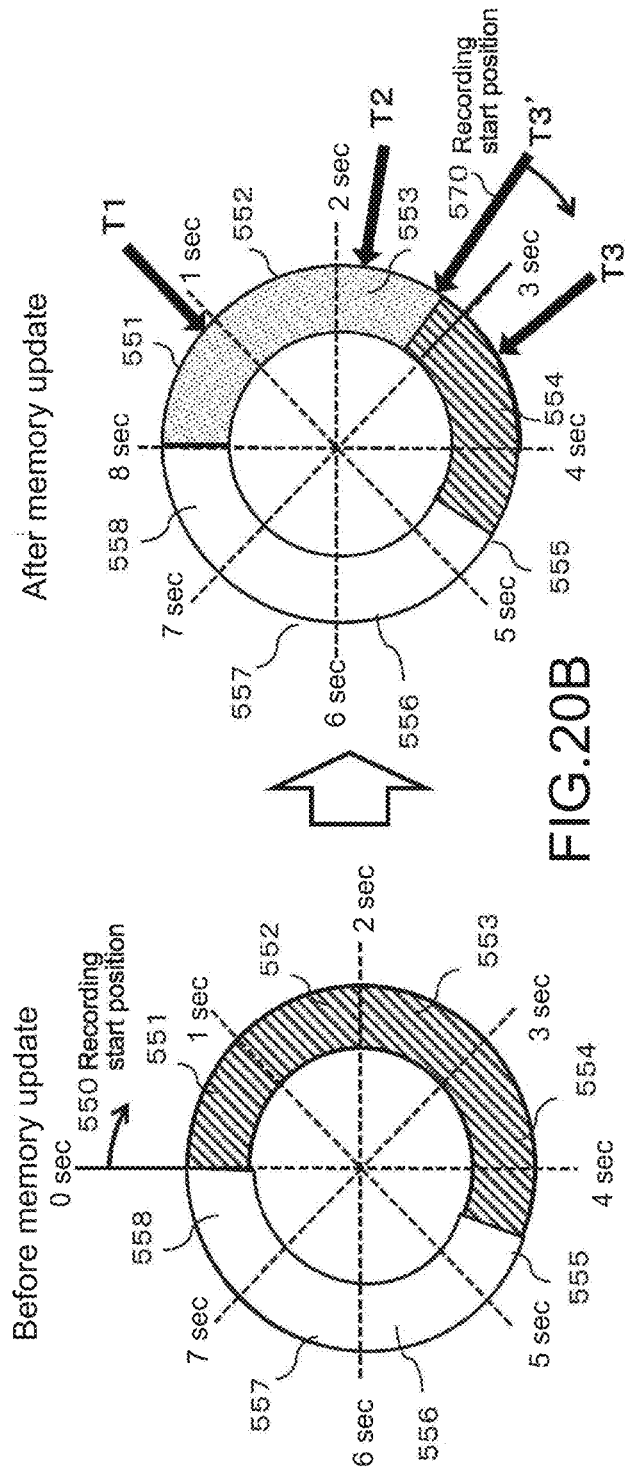

Note that, also in the example shown in FIGS. 20A and 20B, the shift instruction is issued after elapse of approximately 4 seconds from the start of the image recording in the memory 105 as in FIGS. 19A and 19B.

As shown in FIG. 20A, the following four frame images 501 to 504 that are acquired from the memory 105 are displayed together with the through image 500 on the display unit 111 as in FIG. 19A.

(1) Frame image 501 of the bird, which is the image captured at the time point when the first peak of the motion amount is detected after the start of the recording (start of the capture process)

(2) Frame image 502 of the aircraft a, which is the image captured at the time point when the second peak of the motion amount is detected after the start of the recording (start of the capture process)

(3) Frame image 503 of the aircraft b, which is the image captured at the time point when the third peak of the motion amount is detected after the start of the recording (start of the capture process)

(4) Frame image 504 of the aircraft c, which is the image captured at the time point when the fourth peak of the motion amount is detected after the start of the recording (start of the capture process)

A recording state in the memory 105 at this time point is shown in FIG. 20B left part before the memory update. This state is the same as that in FIG. 19 left part.

The recording start position 550 is an initial set position, which is set as a time point of the start of the capture.

Captured images are stored from the memory region 551 to the half of the memory region 555.

The part of the memory region 555, and the memory regions 556 to 558 are used as storage regions for images to be subsequently captured.

In such a state, as shown in FIG. 20A, the user issues the shift instruction of specifying the image 503 of the aircraft b.

In the example described with reference to FIGS. 19A and 19B, this shift instruction is interpreted as an instruction of setting the image 503 of the aircraft b as a recording start position.

However, in the example shown in FIGS. 20A and 20B, a time position of a local minimum position (valley) of the motion amount preceding the peak (T3) of the motion amount, which corresponds to the image 503 of the aircraft b, is set as a recording start position by the shift instruction of specifying the image 503 of the aircraft b.

The example shown in FIGS. 20A and 20B is described with reference to the graph shown in (A) of FIG. 18.

The peak of the motion amount, which corresponds to the image 503 of the aircraft b, is detected at the timing T3. The control unit 103 detects the time position preceding the peak timing T3, at which the motion amount becomes local minimum, in other words, becomes a valley. As is understood from (A) of FIG. 18, a time position T3' corresponds to the valley preceding the peak timing T3.

The control unit 103 sets the time position corresponding to the valley as a recording start position in the memory 105.

In the example of the process shown in FIGS. 20A and 20B, when the user issues the shift instruction of specifying the image 503 of the aircraft b as shown in FIG. 20A, which corresponds the peak of the motion amount, the time position of the valley of the motion amount preceding the peak of the motion amount, which corresponds to the image 503 of the aircraft b, is set as the recording start position in the memory 105.

Under the control by the control unit 103 and the memory control unit 106, the recording start position 550 in the memory 105, which is shown in FIG. 20B left part, is shifted to a recording start position 570 shown in FIG. 20B right part.

The recording start position 570 shown in FIG. 20B corresponds to the timing T3' that corresponds to the position of the valley at which a local minimum value of the motion amount is detected and that precedes the timing T3 corresponding to the recording position of the image 503 of the aircraft b. In other words, the recording start position 570 corresponds to the position of the valley of the motion amount at the timing T3', which is described with reference to FIGS. 19A and 19B.

The state shown in FIG. 20B right part after the memory update corresponds to a state of the memory after the shift process. The memory 105 is updated by executing the following processes (1) and (2).

(1) Shifting the recording start position to a recording position of an image specified by the shift instruction, that is, the timing T3' that corresponds to the position of the valley of the motion amount and precedes the recording position of the image 503 of the aircraft b at the timing T3 at which the peak of the motion amount is detected.

(2) Setting recording regions for images preceding the timing T3' as deletable regions, that is, as writable regions for subsequent captured images.

In the process (2), as shown in FIG. 20B right part, images stored in the recording regions for the images preceding the timing T3' that precedes the image specified by the shift instruction and corresponds to the position of the valley of the motion amount, specifically, regions from the memory region 551 to a point corresponding to the timing T3' in the memory region 553, which are indicated as dotted regions in FIG. 20B right part, are set as deletable images. With this, writable regions for subsequent captured images are secured.

By this memory update process, as shown in FIG. 20B right part, in the memory 105 after the update, regions from the memory region 551 to a former part of the memory region 553 are set as additional image writable regions in addition to regions from the latter part of the memory region 555 to the memory region 558.

This shift process enables the user to reliably set, as a recording start image of the aircraft b, an image preceding the image 503 of the aircraft b displayed on the display unit 111 as shown in FIG. 20A.

Note that, in the embodiment described with reference to FIGS. 17, 20A, and 20B the images corresponding to the positions of the peaks of the motion amount are displayed as the frame images adjacent to each other in the order of the capture timings on the display unit 111. However, the frame images to be displayed may be reordered as appropriate based, for example, on the motion amount.

Further, in the above description, the motion amount detection process executed by the motion amount detection unit 113 is a process of calculating a total sum of differences between pixel values of all the successively captured images. However, other methods may be employed.

Specifically, motion amounts of objects (photographic subjects) that are each determined as an active photographic subject may be respectively calculated, and the largest one of the motion amounts of the objects may be set as a motion amount of frame images of an object having the largest one of the motion amount.

[8. Image Capture Process and Image Recording Process According to Fourth Embodiment]

Next, an imaging apparatus according to a fourth embodiment of the present disclosure is described.

In the first to third embodiments described above, the shift process is executed to change the recording start position in the memory 105, and memory update is performed to change data items of preceding captured images with respect to the recording start position into deletable data items, that is, into regions to be overwritten by subsequent captured images.

In the fourth embodiment described below, the data items of the preceding captured images with respect to the recording start position are not completely deleted, and instead, an amount of the data is reduced by a thinning-out process. The thinning-out process is executed to reduce the data so as to create free regions in the memory 105, and subsequent captured images are stored in the free regions.

An example of the update process in the memory 105 according to this embodiment is described with reference to FIG. 21.

Figure 21:
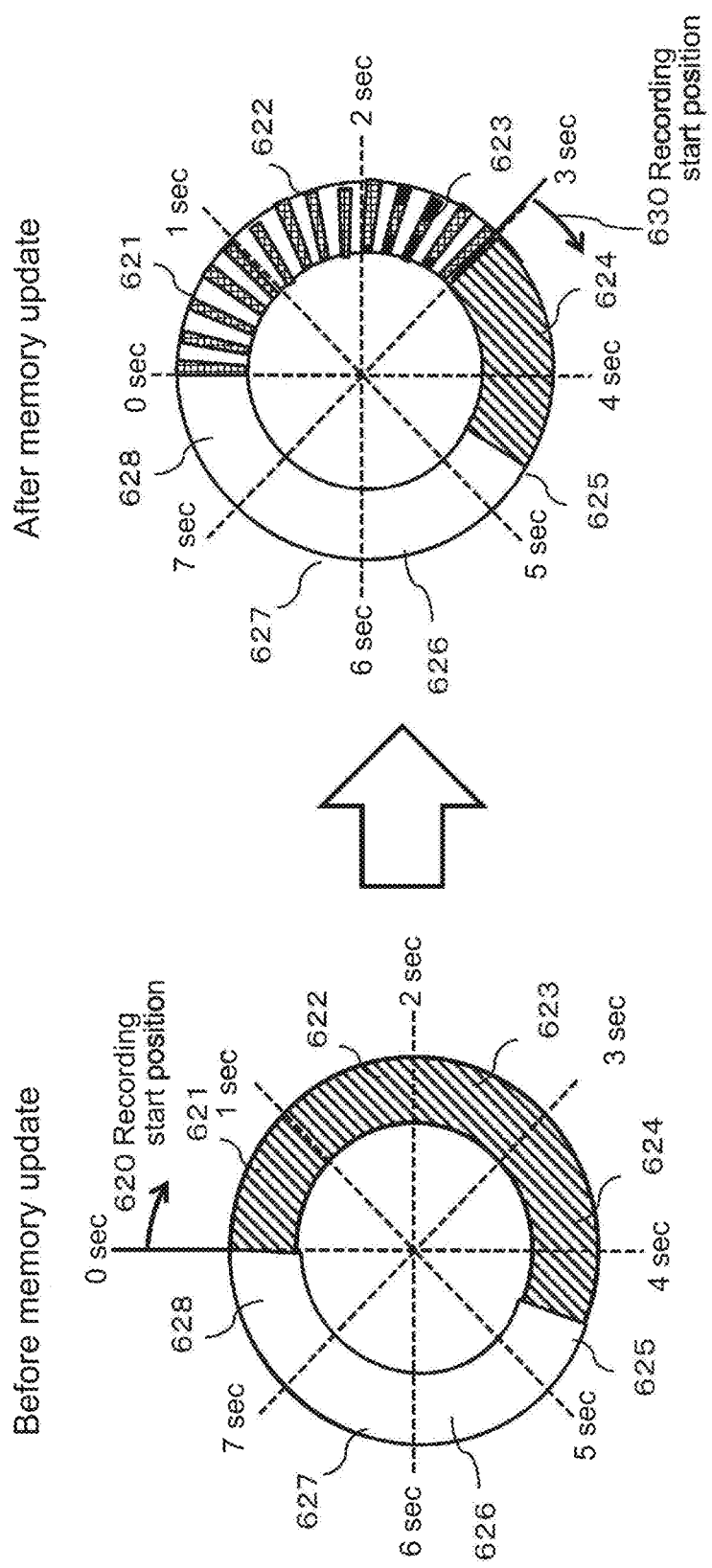
FIG. 21 is an explanatory view of a case of performing data compression as the memory update process in the case of executing the shift process.

FIG. 21 show the following two states of the memory 105.

A Before the memory update, that is, a state of the memory 105 before execution of the shift instruction by the user B After the memory update, that is, a state of the memory 105 after execution of the shift instruction by the user A recording state in the memory 105 before the shift instruction by the user is shown in FIG. 21 left part before the memory update.

A recording start position 620 is an initial set position, which is set as a time point of a start of capture.

Captured images are stored from a memory region 621 to a half of a memory region 625.

Part of the memory region 625, and memory regions 626 to 628 are used as storage regions for images to be subsequently captured.

In such a state, the user issues a shift instruction by specifying an image displayed on the display unit.

The shift instruction is issued, for example, by specifying an image that is captured after elapse of 3 seconds from the start of the capture.

In response to input of the shift instruction, under the control by the control unit 103 and the memory control unit 106, the recording start position 620 in the memory 105, which is shown in FIG. 21 left part, is shifted to a recording start position 630 shown in FIG. 21 right part.

The recording start position 630 shown in FIG. 21 right part corresponds to a recording position of the image that is captured after the elapse of 3 seconds from the start of the capture.

In the embodiments described above, all the images recorded preceding the recording start position 630 are set as deletable images. Specifically, the captured images stored in the memory regions 621 to 623 are deleted, and those regions are used as recording regions for subsequent captured images.

In this embodiment, the images recorded in memory regions preceding the recording start position 630 that is newly set by the shift process are not deleted, and instead, the data amount is reduced to create free regions.

Examples of a method of reducing the data amount include a process of lowering a frame rate. Specifically, a frame rate of images to be captured is set to 240 fps, that is, the number of frame images to be captured per second is set to 240.

With this setting, data items of 240 images are stored in the memory region 621 shown in FIG. 21 right part, and data items of 240 images are stored also in each of the memory regions 622 to 628.

In this embodiment, a process of reducing the data amount is executed instead of a process of deleting the images recorded in the memory regions preceding the recording start position 630 that is newly set by the shift process, specifically, in the memory regions 621 to 623.

Specifically, a process of thinning out the images at 240 fps in frame units is executed to provide images at 120 fps, or images at 60 fps or 30 fps.

By this thinning-out process, a data amount of the images stored in the memory regions 621 to 623 is reduced to create free regions. Those free regions are used as storage regions for subsequent capture images.

Specifically, only a memory region in which images to be thinned out by frame thinning-out are recorded is set as an overwritable region. A region in which images other than the images to be thinned out by frame thinning-out are recorded is not subjected to overwriting, and the images therein are maintained as they are as recorded images.

More specifically, in order to thin out the images at 240 fps into images at 120 fps, odd frames of a 1st frame, a 3rd frame, a 5th frame, a 7th frame, and subsequent odd frames are maintained, and even frames of a 2nd frame, a 4th frame, a 6th frame, an 8th frame, and subsequent even frames are set as images to be thinned out.

In other words, in the memory regions 621 to 623, recording regions for the odd frames of the 1st frame, the 3rd frame, the 5th frame, the 7th frame, and subsequent odd frames are not set as overwritable regions, and only recording regions for the even frames of the 2nd frame, the 4th frame, the 6th frame, the 8th frame, and subsequent even frames are set as overwritable regions.

Those processes enable overwritable regions to be set partially in the memory regions 621 to 623, and those overwritable regions to be used as storage regions for subsequent captured images.

Note that, the thinning-out process described above as a specific example of thinning-out processes is executed in a time direction. However, the data amount may be reduced by thinning out pixels in frame images. Specifically, a process of reducing image resolution by thinning out the pixels in the frame images without changing the frame rate of 240 fps may be executed.

Alternatively, a process of thinning-out the frames in the time direction and thinning-out the pixels in the frame images may be executed.

[9. Summary of Advantages of Processes that are Executed by Imaging Apparatus According to Embodiments of Present Disclosure]

Hereinabove, the image capture processes and the image recording processes that are executed by the imaging apparatus according to the plurality of embodiments of the present disclosure are described.

In the following, advantages of the image capture processes and the image recording processes that are executed by the imaging apparatus according to the plurality of embodiments of the present disclosure are summarized.

The processes in the imaging apparatus according to the plurality of embodiments of the present disclosure provide, for example, the following advantages:

1. Even when capacity of a memory configured to temporarily record captured images is limited, a user can easily capture a scene that the user likes.

2. Captured images of unnecessary scenes are overwritten, and hence the scene that the user likes can be captured over a longer time period without deterioration in image quality.

3. Captured images of scenes as candidates-to-be-overwritten are displayed always on the display unit, and hence the user can easily determine whether or not to prolong capturing by the overwriting.

4. As described above, the captured images of the scenes as candidates-to-be-overwritten are displayed always on the display unit. The user can issue an instruction of overwriting the unnecessary scenes only by selecting the images, and hence can easily select and capture a scene-to-be-recorded.

5. Desired scenes can be easily recorded without deterioration in image quality. Scenes that have been determined to be unnecessary are subjected to a thinning-out process so as to reduce a data amount. In this way, the unnecessary scenes can be recorded as auxiliary low quality images.

Further, instructions of functions to delete unnecessary parts, change a frame rate, and change a display size can be issued via a UI at the time of capturing. Thus, time and effort in subsequent editing can be saved.

[10. Summary of Configuration According to Embodiments of Present Disclosure]

Hereinabove, the present disclosure has been described in detail with reference to specific embodiments. However, as a matter of course, those skilled in the art may make modifications and alterations of the embodiments without departing from the gist of the present disclosure. In other words, the present disclosure has been described hereinabove merely as an example, and hence should not be limitedly construed. The gist of the present disclosure should be determined with reference to the appended claims.

The technology disclosed in this specification may employ the following configurations:

(1) An imaging apparatus, including:
a memory configured to store data items of images input via an imaging unit;
a display unit configured to display the images stored in the memory; and
a control unit configured to control recording of the images stored in the memory in response to a shift instruction from a user,
the control unit executing memory control of updating a recording start position of the data items of the images stored in the memory in response to the shift instruction from the user, the shift instruction containing an information item of specifying any of the images displayed on the display unit, and
setting an overwritable region in a recording region for preceding captured images with respect to the updated recording start position, to thereby secure a recording region for subsequent captured images.

(2) The imaging apparatus according to (1), in which the control unit executes a memory update process of setting a recording position of a specified image in the memory as a new recording start position in response to the shift instruction from the user, the shift instruction containing the information item of specifying any of the images displayed on the display unit.

(3) The imaging apparatus according to (1) or (2), in which the control unit executes display control so that
an already captured image stored in the memory is displayed as a first frame image on the display unit, and that
an image captured after elapse of a predetermined time period T from a time point when the first frame image is captured is displayed as a second frame image on the display unit, and
executes a memory update process of setting a recording position of the second frame image in the memory as a new recording start position in response to the shift instruction from the user, the shift instruction containing an information item of specifying the second frame image.

(4) The imaging apparatus according to (3), in which the control unit executes
the memory update process of setting the recording position of the second frame image in the memory as the new recording start position, and
a display-unit update process in which the second frame image displayed on the display unit is displayed as an updated first frame image, and an image captured after elapse of the predetermined time period T from a time point when the updated first frame image is captured is displayed as an updated second frame image.

(5) The imaging apparatus according to (1), in which the control unit executes
display control of sequentially displaying images captured at intervals of the predetermined time period T on the display unit, and
a memory update process of setting a recording position of a specified image in the memory as a new recording start position in response to the shift instruction from the user, the shift instruction containing an information item of specifying any of the images sequentially displayed on the display unit.

(6) The imaging apparatus according to (5), in which the control unit executes
the memory update process of setting the recording position of the specified image in the memory as the new recording start position, and
a display-unit update process of deleting images displayed on the display unit, the deleted images being captured preceding the specified image, and
sequentially displaying the specified image and images that are captured subsequently to the specified image at the intervals of the predetermined time period T.

(7) The imaging apparatus according to (1), in which the control unit executes display control of equally dividing, in a capture time direction, images from a captured image at the recording start position in the memory to a currently captured image, and
sequentially displaying images at respective boundaries on the display unit, and
a memory update process of setting a recording position of a specified image in the memory as a new recording start position in response to the shift instruction from the user, the shift instruction containing an information item of specifying any of the images sequentially displayed on the display unit.

(8) The imaging apparatus according to (1), further including a motion amount detection unit configured to detect a motion amount of a photographic subject in captured images,
in which the control unit executes a process of displaying an image corresponding to a peak of the motion amount on the display unit by using information detected by the motion amount detection unit.

(9) The imaging apparatus according to (8), in which the control unit executes a memory update process of setting a recording position of the image corresponding to the peak of the motion amount as a new recording start position in response to the shift instruction from the user, the image corresponding to the peak of the motion amount being stored in the memory and specified by the user, the shift instruction containing the information item of specifying any of the images displayed on the display unit.

(10) The imaging apparatus according to (1), in which the control unit executes, in response to the shift instruction from the user, a memory update process of
specifying a motion-amount-local-minimum image corresponding to a local minimum value of the motion amount preceding a capture timing of the image corresponding to the peak of the motion amount, and
setting a recording position of the specified motion-amount-local-minimum image in the memory as a new recording start position, the image corresponding to the peak of the motion amount being specified by the user, the shift instruction containing the information item of specifying any of the images displayed on the display unit.

(11) The imaging apparatus according to (1), in which the control unit
updates the recording start position of the data items of the images stored in the memory in response to the shift instruction from the user, and
executes a thinning-out process on recorded data items of the preceding captured images with respect to the updated recording start position so that the overwritable region is set in the part of the recording region for the preceding captured images, to thereby secure the recording region for the subsequent captured images.

(12) The imaging apparatus according to (11), in which the control unit
executes a data thinning-out process of lowering frame rates of the recorded data items of the preceding captured images with respect to the updated recording start position, and setting an image recording region for images that are changed into deletion objects by the lowering of the frame rates as the overwritable region, to thereby secure the recording region for the subsequent captured images.

(13) An image recording processing method that is executed in an imaging apparatus, the imaging apparatus including:

a memory configured to store data items of images input via an imaging unit;

a display unit configured to display the images stored in the memory; and a control unit configured to control recording of the images stored in the memory in response to a shift instruction from a user, the control unit executing memory control of updating a recording start position of the data items of the images stored in the memory in response to the shift instruction from the user, the shift instruction containing an information item of specifying any of the images displayed on the display unit, and setting an overwritable region in a recording region for preceding captured images with respect to the updated recording start position, to thereby secure a recording region for subsequent captured images.

(14) A program causing an imaging apparatus to execute an image recording process, the imaging apparatus including:

a memory configured to store data items of images input via an imaging unit;

a display unit configured to display the images stored in the memory; and a control unit configured to control recording of the images stored in the memory in response to a shift instruction from a user, the program causing the control unit to execute memory control of updating a recording start position of the data items of the images stored in the memory in response to the shift instruction from the user, the shift instruction containing an information item of specifying any of the images displayed on the display unit, and setting an overwritable region in a recording region for preceding captured images with respect to the updated recording start position, to thereby secure a recording region for subsequent captured images.

Note that, a series of processes described in the specification can be executed with hardware, software, or a composite configuration of the hardware and the software. In order that the processes can be executed with the software, programs, which store a sequence of the processes and are installed in a memory in a computer incorporated in dedicated hardware, are executed. Alternatively, the programs to be executed may be installed in a general purpose computer capable of executing various processes. More specifically, the programs may be recorded in advance in a recording medium, or may be installed from the recording medium to the computer. Alternatively, the programs may be received via networks such as a LAN (Local Area Network) or the Internet, and then installed to recording media such as a built-in hard disk.

Note that, the various processes described in the specification need not necessarily be executed in time series according to the description, and may be executed in parallel or individually in accordance with processing capabilities of apparatus that execute the processes or as appropriate. Further, the "system" in this specification refers to a logical collective configuration of a plurality of apparatus, and those apparatus having respective configurations are not necessarily provided in the same casing.

Note that, as described hereinabove, according to the configuration of an embodiment of the present disclosure, even when capacity of a memory configured to temporarily record captured images is limited, an image segment that is finally recorded in a medium can be easily changed.

Specifically, recording in the memory configured to temporarily record the captured images is controlled in response to a shift instruction from a user. A control unit receives, from the user, the shift instruction containing an information item of specifying any of images displayed on a display unit, and updates an image recording start position in the memory in response to the shift instruction. A recording region for preceding captured images with respect to the updated recording start position is set as an overwritable region so that subsequent captured images can be recorded. The display unit displays, for example, images captured at intervals of a predetermined time period so that the user can select any of the images and issue the shift instruction. In this way, a region preceding a position of a selected image in the memory is set to be overwritable so that the subsequent captured images are recorded.

With the configuration described above, even when the captured images are temporarily recorded in the limited capacity of the memory, the image segment that is finally recorded in the medium can be easily changed.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus, comprising:
a memory configured to store a plurality of images that are captured by an imaging unit;
a display unit configured to display the plurality of images stored in the memory,
wherein one of the plurality of images that corresponds to a recording start position in the memory is displayed at a first position in a sequence of the displayed plurality of images; and
a control unit configured to:
control a display unit to display a first captured image of the plurality of captured images that corresponds to a first recording position in the memory before a second captured image of the plurality of captured images that corresponds to a second recording position in the memory in the sequence of the displayed plurality of images,
detect a shift instruction input from a user,
specify the displayed second captured image of the plurality of captured images based on the detection of the shift instruction input,
update the recording start position to the second recording position in the memory that corresponds to the specified second captured image,
control the display unit to update display such that the second captured image that corresponds to the second recording position is displayed at first position in the sequence of the displayed plurality of captured images, and
store a third captured image at least at the first recording position in the memory,
wherein the third captured image is captured by the imaging unit after the update of the recording start position.

2. The imaging apparatus according to claim 1, wherein the control unit is further configured to:

control the display unit to:
  display the first captured image of the plurality of captured images stored in the memory as a first frame image on the display unit, and
  display the second captured image that is captured after elapse of a time period from a first time point of capture of the first frame image, as a second frame image on the display unit.

3. The imaging apparatus according to claim 2, wherein the control unit is further configured to:
  control the display unit to:
    display the second frame image on the display unit as an updated first frame image, and
    display the third captured image that is captured after elapse of the time period from a second time point of capture of the updated first frame image, as an updated second frame image.

4. The imaging apparatus according to claim 1, wherein the control unit is further configured to:
  wherein the images are captured at intervals of a time period, and
  set the second recording position of the specified displayed second capture image in the memory as the second recording position based on the shift instruction input.

5. The imaging apparatus according to claim 4, wherein the control unit is further configured to:
  delete the first captured image stored in the first recording position in the memory based on the specified second captured image, and
  control the display unit to display the second captured image and the third captured image, wherein the third captured image is captured subsequently to the second captured image at the intervals of the time period.

6. The imaging apparatus according to claim 1, wherein the control unit is further configured to:
  equally divide, in a capture time direction, the plurality of captured images from a captured image at the recording start position in the memory to a currently captured image, and
  control the display unit to sequentially display the plurality of captured images at respective boundaries of the display unit, and
  specify at least one captured image of the plurality of captured images sequentially displayed on the display unit based on the detection of the shift instruction input.

7. The imaging apparatus according to claim 1, further comprising a motion amount detection unit configured to detect a motion amount of a photographic subject in the plurality of captured images,
  wherein the control unit is further configured to control the display unit to display an image of the plurality of captured images that corresponds to a peak of the motion amount detected by the motion amount detection unit.

8. The imaging apparatus according to claim 7, wherein the control unit is further configured to update a recording position of the image corresponding to the peak of the motion amount as the recording start position based on the shift instruction from the user.

9. The imaging apparatus according to claim 1, wherein based on the shift instruction from the user, the control unit is further configured to:
  specify a motion-amount-local-minimum image corresponding to a local minimum value of a motion amount that precedes a capture timing of the image corresponding to the peak of the motion amount, and
  update a recording position of the specified motion-amount-local-minimum image in the memory as the recording start position.

10. The imaging apparatus according to claim 1, wherein the control unit is further configured to:
  execute a thinning-out process on the first captured image with respect to the updated recording start position so that an overwritable region is set in a portion of a recording region for the first captured image, to secure the recording region for the third captured image.

11. The imaging apparatus according to claim 10, wherein the control unit is further configured to:
  execute a data thinning-out process of lowering frame rates of the first captured image with respect to the updated recording start position, and
  update the recording region for the first captured image by the lowering of the frame rates as the overwritable region, to thereby secure the recording region for the third captured image.

12. The imaging apparatus according to claim 1, wherein the shift instruction is inputted based on at least one of the plurality of images displayed on the display unit.

13. The imaging apparatus according to claim 1, wherein the control unit is further configured to delete the first captured image stored in the first recording position in the memory based on the detection of the shift instruction input.

14. An image recording method, comprising:
  in an imaging apparatus:
    storing a plurality of images that are captured by an imaging unit in a memory of an imaging apparatus;
    controlling display of the plurality of images, stored in the memory, on a display unit of the imaging apparatus,
    wherein one of the plurality of images that corresponds to a recording start position in the memory is displayed at a first position in a sequence of the displayed plurality of images, and
    wherein a first captured image of the plurality of captured images that corresponds to a first recording position in the memory is displayed before a second captured image of the plurality of captured images that corresponds to a second recording position in the memory in the sequence of the displayed plurality of images;
    detecting a shift instruction input from a user;
    specifying the displayed second captured image of the plurality of captured images based on the detection of the shift instruction input;
    updating the recording start position to the second recording position in the memory that corresponds to the specified second captured image;
    controlling the display unit to update display such that the second captured image that corresponds to the second recording position is displayed at first position in the sequence of the displayed plurality of captured images; and
    storing a third captured image at least at the first recording position in the memory,
    wherein the third captured image is captured by the imaging unit after the update of the recording start position.

15. A non-transitory computer-readable medium having stored thereon, computer-executable instructions for causing an imaging apparatus to execute operations, the operations comprising:
  storing a plurality of images that are captured by an imaging unit;

controlling display of the stored plurality of images on a display unit of the imaging apparatus,
- wherein one of the plurality of images that corresponds to a recording start position in a memory is displayed at a first position in a sequence of the displayed plurality of images, and
- wherein a first captured image of the plurality of captured images that corresponds to a first recording position in the memory is displayed before a second captured image of the plurality of captured images that corresponds to a second recording position in the memory in the sequence of the displayed plurality of images;

detecting a shift instruction input from a user;

specifying the displayed second captured image of the plurality of captured images based on the detection of the shift instruction input;

updating the recording start position to the second recording position in the memory that corresponds to the specified second captured image;
- controlling the display unit to update display such that the second captured image that corresponds to the second recording position is displayed at first position in the sequence of the displayed plurality of captured images; and
- storing a third captured image at least at the first recording position in the memory,
- wherein the third captured image is captured by the imaging unit after the update of the recording start position.

* * * * *